(12) United States Patent
Westwood (10) Patent No.: US 8,748,693 B2
(45) Date of Patent: Jun. 10, 2014

(54) MULTI-LAYER NONWOVEN IN SITU LAMINATES AND METHOD OF PRODUCING THE SAME

(75) Inventor: Alistair Duncan Westwood, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1140 days.

(21) Appl. No.: 12/566,410

(22) Filed: Sep. 24, 2009

(65) Prior Publication Data

US 2010/0222755 A1    Sep. 2, 2010

Related U.S. Application Data (60) Provisional application No. 61/171,135, filed on Apr. 21, 2009, provisional application No. 61/156,078, filed on Feb. 27, 2009.

(51) Int. Cl.
*A61F 13/15* (2006.01)
*B32B 5/02* (2006.01)

(52) U.S. Cl.
USPC .............. 604/383; 442/63; 442/387; 442/389

(58) Field of Classification Search
USPC .............. 604/387, 383; 442/63, 381, 387, 389
See application file for complete search history.

(56) References Cited

U.S. PATENT DOCUMENTS

| | | |
|---|---|---|
| 3,149,178 A | 9/1964 | Hamilton et al. |
| 3,338,992 A | 8/1967 | Kinney |
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,042,740 A | 8/1977 | Krueger |
| 4,100,324 A | 7/1978 | Anderson et al. |

(Continued)

FOREIGN PATENT DOCUMENTS

| | | |
|---|---|---|
| CA | 1 268 753 | 5/1990 |
| EP | 0 129 368 | 12/1984 |

(Continued)

OTHER PUBLICATIONS

Barden, B., "*Coated Fabrics*", Kirk-Othmer Encyclopedia of Chemical Technology, John Wiley & Sons, pp. 1-13 (1993).

(Continued)

*Primary Examiner* — Lynne Anderson (57) ABSTRACT

Described herein is a meltspun laminate comprising two or more layers of meltspun fabrics, wherein layers that are adjacent to one another are in situ entangled with one another to define an interfacial region of mixed fibers between the layers. Also described herein is a method of making a meltspun in situ laminate comprising simultaneously meltspinning two or more polymer melts adjacent to one another to form adjacent fabrics, wherein layers that are adjacent to one another are in situ entangled with one another to form an interfacial region of mixed fibers between the layers. Also described herein is a meltspinning apparatus comprising one or more dies, each die comprising two or more meltspinning zones, wherein each zone comprises a plurality of nozzles that are fluidly connected to the corresponding zone, and wherein each zone is fluidly connected to a melt extruder.

15 Claims, 1 Drawing Sheet

(56) References Cited

U.S. PATENT DOCUMENTS

| | | |
|---|---|---|
| 4,103,058 A | 7/1978 | Humlicek |
| 4,105,381 A | 8/1978 | Platt et al. |
| 4,116,892 A | 9/1978 | Schwarz |
| 4,144,008 A | 3/1979 | Schwarz |
| 4,153,751 A | 5/1979 | Schwarz |
| 4,177,312 A | 12/1979 | Rasen et al. |
| 4,209,563 A | 6/1980 | Sisson |
| 4,223,059 A | 9/1980 | Schwarz |
| 4,251,585 A | 2/1981 | Schwarz |
| 4,252,590 A | 2/1981 | Rasen et al. |
| 4,285,100 A | 8/1981 | Schwarz |
| 4,289,832 A | 9/1981 | Schwarz |
| 4,340,563 A | 7/1982 | Appel et al. |
| 4,368,565 A | 1/1983 | Schwarz |
| 4,380,570 A | 4/1983 | Schwarz |
| 4,410,602 A | 10/1983 | Komoda et al. |
| 4,461,872 A | 7/1984 | Su |
| 4,540,753 A | 9/1985 | Cozewith et al. |
| 4,657,802 A | 4/1987 | Morman |
| 4,775,579 A | 10/1988 | Hagy et al. |
| 4,818,464 A | 4/1989 | Lau |
| 4,827,064 A | 5/1989 | Wu |
| 4,827,073 A | 5/1989 | Wu |
| 4,950,531 A * | 8/1990 | Radwanski et al. .......... 442/351 |
| 4,950,720 A | 8/1990 | Randall, Jr. et al. |
| 4,965,122 A | 10/1990 | Morman |
| 4,981,747 A | 1/1991 | Morman |
| 5,017,714 A | 5/1991 | Welborn, Jr. |
| 5,055,438 A | 10/1991 | Canich |
| 5,057,475 A | 10/1991 | Canich et al. |
| 5,078,935 A | 1/1992 | Kobayashi et al. |
| 5,096,867 A | 3/1992 | Canich |
| 5,108,820 A | 4/1992 | Kaneko et al. |
| 5,108,827 A | 4/1992 | Gessner |
| 5,114,787 A | 5/1992 | Chaplin et al. |
| 5,130,076 A | 7/1992 | Blatz et al. |
| 5,143,679 A | 9/1992 | Weber et al. |
| 5,145,727 A | 9/1992 | Potts et al. |
| 5,147,712 A | 9/1992 | Miyahara et al. |
| 5,153,157 A | 10/1992 | Hlatky et al. |
| 5,156,793 A | 10/1992 | Buell et al. |
| 5,167,897 A | 12/1992 | Weber et al. |
| 5,171,908 A | 12/1992 | Rudnick |
| 5,182,162 A | 1/1993 | Andrusko |
| 5,187,005 A | 2/1993 | Stahle et al. |
| 5,188,885 A | 2/1993 | Timmons et al. |
| 5,190,812 A | 3/1993 | Joseph et al. |
| 5,198,401 A | 3/1993 | Turner et al. |
| 5,226,992 A | 7/1993 | Morman |
| 5,227,224 A | 7/1993 | Ishikawa et al. |
| 5,230,949 A | 7/1993 | Howard et al. |
| 5,234,423 A | 8/1993 | Alemany et al. |
| 5,238,733 A | 8/1993 | Joseph et al. |
| 5,240,894 A | 8/1993 | Burkhardt et al. |
| 5,242,436 A | 9/1993 | Weil et al. |
| 5,244,724 A | 9/1993 | Antonacci et al. |
| 5,260,126 A | 11/1993 | Collier, IV et al. |
| 5,264,405 A | 11/1993 | Canich |
| 5,272,003 A | 12/1993 | Peacock |
| 5,288,791 A | 2/1994 | Collier, IV et al. |
| 5,292,389 A | 3/1994 | Tsuji et al. |
| 5,294,482 A | 3/1994 | Gessner |
| 5,306,545 A | 4/1994 | Shirayanagi et al. |
| 5,320,891 A | 6/1994 | Levy et al. |
| 5,324,576 A | 6/1994 | Reed et al. |
| 5,324,580 A | 6/1994 | Allan et al. |
| 5,324,800 A | 6/1994 | Welborn, Jr. et al. |
| 5,330,458 A | 7/1994 | Buell et al. |
| 5,330,829 A | 7/1994 | Miller |
| 5,332,613 A | 7/1994 | Taylor et al. |
| 5,334,636 A | 8/1994 | Fujii et al. |
| 5,336,457 A | 8/1994 | Wu et al. |
| 5,336,545 A | 8/1994 | Morman |
| 5,346,756 A | 9/1994 | Ogale et al. |
| 5,349,016 A | 9/1994 | DeNicola, Jr. et al. |
| 5,358,500 A | 10/1994 | Lavon et al. |
| 5,366,782 A | 11/1994 | Curro et al. |
| 5,366,786 A | 11/1994 | Connor et al. |
| 5,366,793 A | 11/1994 | Fitts, Jr. et al. |
| 5,368,584 A | 11/1994 | Clear et al. |
| 5,368,919 A | 11/1994 | Robeson |
| 5,368,927 A | 11/1994 | Lesca et al. |
| 5,372,885 A | 12/1994 | Tabor et al. |
| 5,382,400 A | 1/1995 | Pike et al. |
| 5,382,461 A | 1/1995 | Wu |
| 5,385,775 A | 1/1995 | Wright |
| 5,393,599 A | 2/1995 | Quantrille et al. |
| 5,418,045 A | 5/1995 | Pike et al. |
| 5,422,172 A | 6/1995 | Wu |
| 5,425,987 A | 6/1995 | Shawver et al. |
| 5,455,110 A | 10/1995 | Connor |
| 5,464,401 A | 11/1995 | Hasse et al. |
| 5,466,411 A | 11/1995 | Butterfass et al. |
| 5,472,775 A | 12/1995 | Obijeski et al. |
| 5,476,616 A | 12/1995 | Schwarz |
| 5,482,765 A | 1/1996 | Bradley et al. |
| 5,482,772 A | 1/1996 | Strack et al. |
| 5,492,753 A | 2/1996 | Levy et al. |
| 5,496,298 A | 3/1996 | Kuepper et al. |
| 5,507,736 A | 4/1996 | Clear et al. |
| 5,523,141 A | 6/1996 | Fyler |
| 5,534,339 A | 7/1996 | Stokes |
| 5,534,340 A | 7/1996 | Gupta et al. |
| 5,536,563 A | 7/1996 | Shah et al. |
| 5,540,976 A | 7/1996 | Shawver et al. |
| 5,549,964 A | 8/1996 | Shohji et al. |
| 5,556,392 A | 9/1996 | Koczab |
| 5,573,841 A | 11/1996 | Adam et al. |
| 5,575,783 A | 11/1996 | Clear et al. |
| 5,591,152 A | 1/1997 | Buell et al. |
| 5,593,768 A | 1/1997 | Gessner |
| 5,607,798 A | 3/1997 | Kobylivker et al. |
| 5,616,408 A | 4/1997 | Oleszczuk et al. |
| 5,620,785 A | 4/1997 | Watt et al. |
| 5,628,741 A | 5/1997 | Buell et al. |
| 5,635,290 A | 6/1997 | Stopper et al. |
| 5,641,445 A | 6/1997 | Fauble et al. |
| 5,643,662 A | 7/1997 | Yeo et al. |
| 5,645,542 A | 7/1997 | Anjur et al. |
| 5,645,933 A | 7/1997 | Sakazume et al. |
| 5,652,051 A | 7/1997 | Shawver et al. |
| 5,653,704 A | 8/1997 | Buell et al. |
| 5,672,415 A | 9/1997 | Sawyer et al. |
| 5,674,216 A | 10/1997 | Buell et al. |
| 5,681,646 A | 10/1997 | Ofosu et al. |
| 5,688,157 A | 11/1997 | Bradley et al. |
| 5,690,627 A | 11/1997 | Clear et al. |
| 5,695,849 A | 12/1997 | Shawver et al. |
| 5,695,868 A | 12/1997 | McCormack |
| 5,698,480 A | 12/1997 | Geiman et al. |
| 5,720,832 A | 2/1998 | Minto et al. |
| 5,723,217 A | 3/1998 | Stahl et al. |
| 5,733,822 A | 3/1998 | Gessner et al. |
| 5,783,531 A | 7/1998 | Andrew et al. |
| 5,804,286 A | 9/1998 | Quantrille et al. |
| 5,817,403 A | 10/1998 | Gillyns et al. |
| 5,824,613 A | 10/1998 | Geiman et al. |
| 5,840,412 A | 11/1998 | Wood et al. |
| 5,843,057 A | 12/1998 | McCormack |
| 5,843,068 A | 12/1998 | Allen et al. |
| 5,861,202 A | 1/1999 | Kimura et al. |
| 5,866,488 A | 2/1999 | Terada et al. |
| 5,874,160 A | 2/1999 | Keck |
| 5,880,241 A | 3/1999 | Brookhart et al. |
| 5,883,028 A | 3/1999 | Morman et al. |
| 5,906,879 A | 5/1999 | Huntoon et al. |
| 5,910,362 A | 6/1999 | Aratake et al. |
| 5,914,084 A | 6/1999 | Benson et al. |
| 5,914,184 A | 6/1999 | Morman |
| 5,916,207 A | 6/1999 | Toyoda et al. |
| 5,921,973 A | 7/1999 | Newkirk et al. |
| 5,928,740 A | 7/1999 | Wilhoit et al. |
| 5,942,451 A | 8/1999 | Daponte et al. |
| 5,945,215 A | 8/1999 | Bersted et al. |

(56) References Cited

U.S. PATENT DOCUMENTS

| | | |
|---|---|---|
| 5,952,252 A | 9/1999 | Shawver et al. |
| 5,985,193 A | 11/1999 | Harrington et al. |
| 5,993,714 A | 11/1999 | Sawyer et al. |
| 5,994,244 A | 11/1999 | Fujiwara et al. |
| 6,015,605 A | 1/2000 | Tsujiyama et al. |
| 6,015,617 A | 1/2000 | Maugans et al. |
| 6,015,764 A | 1/2000 | McCormack et al. |
| 6,028,240 A | 2/2000 | Wessel et al. |
| 6,037,281 A | 3/2000 | Mathis et al. |
| 6,045,898 A | 4/2000 | Kishi et al. |
| 6,071,451 A | 6/2000 | Wang et al. |
| 6,075,179 A | 6/2000 | McCormack et al. |
| 6,080,818 A | 6/2000 | Thakker et al. |
| 6,083,583 A | 7/2000 | Klocek et al. |
| 6,090,472 A | 7/2000 | Wang et al. |
| 6,090,730 A | 7/2000 | Fujiwara et al. |
| 6,096,668 A | 8/2000 | Abuto et al. |
| 6,103,647 A | 8/2000 | Shultz et al. |
| 6,114,261 A | 9/2000 | Strelow et al. |
| 6,114,263 A | 9/2000 | Benson et al. |
| 6,117,546 A | 9/2000 | Geiman et al. |
| 6,140,551 A | 10/2000 | Niemeyer et al. |
| 6,207,237 B1 | 3/2001 | Haffner |
| 6,207,601 B1 | 3/2001 | Maurer et al. |
| 6,207,602 B1 | 3/2001 | Gessner et al. |
| 6,224,977 B1 | 5/2001 | Kobylivker et al. |
| 6,261,674 B1 | 7/2001 | Branham et al. |
| 6,268,203 B1 | 7/2001 | Johnson et al. |
| 6,268,302 B1 | 7/2001 | Ofosu et al. |
| 6,281,289 B1 | 8/2001 | Maugans et al. |
| 6,286,145 B1 | 9/2001 | Welchel et al. |
| 6,312,641 B1 | 11/2001 | Hutchinson |
| 6,323,389 B1 | 11/2001 | Thomas et al. |
| 6,342,565 B1 | 1/2002 | Cheng et al. |
| 6,352,426 B1 | 3/2002 | Hutchinson et al. |
| 6,355,348 B1 | 3/2002 | Takesue et al. |
| 6,362,389 B1 | 3/2002 | McDowall et al. |
| 6,372,172 B1 | 4/2002 | Sudduth et al. |
| 6,391,408 B1 | 5/2002 | Hutchinson |
| 6,410,465 B1 | 6/2002 | Lim et al. |
| 6,417,121 B1 | 7/2002 | Newkirk et al. |
| 6,417,122 B1 | 7/2002 | Newkirk et al. |
| 6,420,285 B1 | 7/2002 | Newkirk et al. |
| 6,443,940 B1 | 9/2002 | Ashton et al. |
| 6,444,774 B1 | 9/2002 | Stahl et al. |
| 6,458,726 B1 | 10/2002 | Harrington et al. |
| 6,465,073 B1 | 10/2002 | Morman et al. |
| 6,465,378 B2 | 10/2002 | Gessner et al. |
| 6,476,289 B1 | 11/2002 | Buell et al. |
| 6,478,785 B1 | 11/2002 | Ashton et al. |
| 6,482,896 B2 | 11/2002 | Maugans et al. |
| 6,503,853 B1 | 1/2003 | Kassner et al. |
| 6,506,695 B2 | 1/2003 | Gardner et al. |
| 6,506,698 B1 | 1/2003 | Quantrille et al. |
| 6,516,472 B2 | 2/2003 | Gessner et al. |
| 6,525,157 B2 | 2/2003 | Cozewith et al. |
| 6,559,262 B1 | 5/2003 | Waymouth et al. |
| 6,569,945 B2 | 5/2003 | Bugada et al. |
| 6,572,598 B1 | 6/2003 | Ashton et al. |
| 6,579,274 B1 | 6/2003 | Morman et al. |
| 6,582,414 B1 | 6/2003 | Richardson |
| 6,586,354 B1 | 7/2003 | Topolkaraev et al. |
| 6,589,892 B1 | 7/2003 | Smith et al. |
| 6,610,039 B1 | 8/2003 | Wilhelm et al. |
| 6,627,564 B1 | 9/2003 | Morman et al. |
| 6,632,212 B1 | 10/2003 | Morman et al. |
| 6,649,546 B2 | 11/2003 | Ohata |
| 6,649,547 B1 | 11/2003 | Arnold et al. |
| 6,676,883 B2 | 1/2004 | Hutchinson et al. |
| 6,717,028 B1 | 4/2004 | Oberstadt |
| 6,777,082 B2 | 8/2004 | Patel et al. |
| 6,780,272 B2 | 8/2004 | Wood |
| 6,881,793 B2 | 4/2005 | Sheldon et al. |
| 6,881,800 B2 | 4/2005 | Friedersdorf |
| 6,887,941 B2 | 5/2005 | Zhou |
| 6,902,796 B2 | 6/2005 | Morell et al. |
| 6,906,160 B2 | 6/2005 | Stevens et al. |
| 6,909,028 B1 | 6/2005 | Shawver et al. |
| 6,914,018 B1 | 7/2005 | Uitenbroek et al. |
| 6,927,184 B1 | 8/2005 | Jacobs-Hartwig et al. |
| 6,939,591 B2 | 9/2005 | Hutchinson et al. |
| 6,946,413 B2 | 9/2005 | Lange et al. |
| 6,960,635 B2 | 11/2005 | Stevens et al. |
| 6,982,231 B1 | 1/2006 | Uitenbroek et al. |
| 6,989,125 B2 | 1/2006 | Boney et al. |
| 6,992,158 B2 | 1/2006 | Datta et al. |
| 6,994,763 B2 | 2/2006 | Austin |
| 7,019,081 B2 | 3/2006 | Datta et al. |
| 7,022,632 B2 | 4/2006 | Hatta et al. |
| 7,026,404 B2 | 4/2006 | Cozewith et al. |
| 7,078,089 B2 | 7/2006 | Ellis et al. |
| 7,101,622 B2 | 9/2006 | Chang et al. |
| 7,101,623 B2 | 9/2006 | Jordan et al. |
| 7,199,203 B2 | 4/2007 | Stevens et al. |
| 7,261,551 B2 | 8/2007 | Hutchinson et al. |
| 7,300,895 B2 | 11/2007 | Kobayashi et al. |
| 7,318,961 B2 | 1/2008 | Loos et al. |
| 7,319,077 B2 | 1/2008 | Mehta et al. |
| 7,320,948 B2 | 1/2008 | Morman et al. |
| 7,329,621 B2 | 2/2008 | Collier, IV et al. |
| 7,332,204 B2 | 2/2008 | Hutchinson et al. |
| 7,335,273 B2 | 2/2008 | Neculescu et al. |
| 7,344,775 B2 | 3/2008 | Stevens et al. |
| 7,355,089 B2 | 4/2008 | Chang et al. |
| 7,355,091 B2 | 4/2008 | Kellenberger et al. |
| 7,404,811 B2 | 7/2008 | Ohnishi et al. |
| 7,405,171 B2 | 7/2008 | Tsujiyama et al. |
| 7,405,172 B2 | 7/2008 | Shigematsu et al. |
| 7,413,803 B2 | 8/2008 | Jordan et al. |
| 7,425,517 B2 | 9/2008 | Deka et al. |
| 7,438,777 B2 | 10/2008 | Pourdeyhimi et al. |
| 7,439,301 B2 | 10/2008 | Handlin, Jr. |
| 7,445,831 B2 | 11/2008 | Ashraf et al. |
| 7,445,838 B2 | 11/2008 | Quinn |
| 7,452,832 B2 | 11/2008 | Bansal et al. |
| 7,462,573 B2 | 12/2008 | Tsujiyama et al. |
| 7,476,447 B2 | 1/2009 | Thomas |
| 7,491,666 B2 | 2/2009 | Smith et al. |
| 7,494,709 B2 | 2/2009 | Davis |
| 7,494,947 B2 | 2/2009 | Boscolo |
| 7,501,034 B2 | 3/2009 | Ashraf |
| 7,601,666 B2 | 10/2009 | Rix et al. |
| 7,795,366 B2 | 9/2010 | Yang et al. |
| 2002/0019507 A1 | 2/2002 | Karandinos et al. |
| 2002/0055316 A1 | 5/2002 | Araida et al. |
| 2003/0125696 A1 | 7/2003 | Morman et al. |
| 2003/0194939 A1 | 10/2003 | Schwarz |
| 2004/0110442 A1 | 6/2004 | Rhim et al. |
| 2004/0121687 A1 | 6/2004 | Morman et al. |
| 2004/0209540 A1 | 10/2004 | Schwarz |
| 2004/0236042 A1 | 11/2004 | Datta et al. |
| 2005/0027080 A1 | 2/2005 | Bodiford et al. |
| 2005/0106978 A1 | 5/2005 | Cheng et al. |
| 2005/0130544 A1 | 6/2005 | Cheng et al. |
| 2005/0148263 A1 | 7/2005 | Zhou et al. |
| 2005/0170729 A1 | 8/2005 | Stadelman et al. |
| 2006/0003658 A1 | 1/2006 | Hall et al. |
| 2006/0135923 A1 | 6/2006 | Boggs et al. |
| 2006/0141886 A1 | 6/2006 | Brock et al. |
| 2006/0151914 A1 | 7/2006 | Gerndt et al. |
| 2006/0172647 A1 | 8/2006 | Mehta et al. |
| 2006/0173123 A1 | 8/2006 | Yang et al. |
| 2006/0199006 A1 | 9/2006 | Poon et al. |
| 2006/0210746 A1 | 9/2006 | Shi et al. |
| 2006/0270303 A1 | 11/2006 | Berrigan et al. |
| 2007/0017075 A1 | 1/2007 | Nguyen |
| 2007/0078222 A1 | 4/2007 | Chang et al. |
| 2007/0092704 A1 | 4/2007 | Patel et al. |
| 2007/0123131 A1 | 5/2007 | Nguyen et al. |
| 2007/0135785 A1 | 6/2007 | Qin et al. |
| 2007/0141937 A1 | 6/2007 | Hendrix et al. |
| 2007/0161747 A1 | 7/2007 | Maier et al. |
| 2007/0173162 A1 | 7/2007 | Ethiopia et al. |
| 2007/0184256 A1 | 8/2007 | Okada et al. |

(56) References Cited

U.S. PATENT DOCUMENTS

| | | |
|---|---|---|
| 2007/0197117 A1 | 8/2007 | Austin et al. |
| 2007/0202330 A1 | 8/2007 | Peng et al. |
| 2007/0203301 A1 | 8/2007 | Autran et al. |
| 2007/0203469 A1 | 8/2007 | Ohnishi et al. |
| 2007/0254545 A1 | 11/2007 | Martin |
| 2007/0287348 A1 | 12/2007 | Autran et al. |
| 2008/0003910 A1 | 1/2008 | Hughes et al. |
| 2008/0014819 A1 | 1/2008 | Suzuki et al. |
| 2008/0026660 A1 | 1/2008 | Ogawa et al. |
| 2008/0038982 A1 | 2/2008 | Motomura et al. |
| 2008/0045917 A1 | 2/2008 | Autran et al. |
| 2008/0061476 A1 | 3/2008 | Hutchinson et al. |
| 2008/0076315 A1 | 3/2008 | McCormack et al. |
| 2008/0119102 A1 | 5/2008 | Hughes et al. |
| 2008/0132135 A1 | 6/2008 | Collias et al. |
| 2008/0132862 A1 | 6/2008 | Collias et al. |
| 2008/0132866 A1 | 6/2008 | Siqueira et al. |
| 2008/0160859 A1 | 7/2008 | Gupta et al. |
| 2008/0160862 A1 | 7/2008 | Sartori et al. |
| 2008/0161765 A1 | 7/2008 | Morman et al. |
| 2008/0172840 A1 | 7/2008 | Kacker et al. |
| 2008/0177242 A1 | 7/2008 | Chang et al. |
| 2008/0182116 A1 | 7/2008 | Dharmarajan et al. |
| 2008/0182468 A1 | 7/2008 | Dharmarajan et al. |
| 2008/0182473 A1 | 7/2008 | Chen et al. |
| 2008/0182940 A1 | 7/2008 | Dharmarajan et al. |
| 2008/0199673 A1 | 8/2008 | Allgeuer et al. |
| 2008/0207071 A1 | 8/2008 | Muslet et al. |
| 2008/0220273 A1 | 9/2008 | Weaver |
| 2008/0221540 A1 | 9/2008 | Thomas et al. |
| 2008/0233819 A1 | 9/2008 | Tsujiyama et al. |
| 2008/0233824 A1 | 9/2008 | Abed et al. |
| 2008/0237911 A1 | 10/2008 | Ardiff et al. |
| 2008/0241447 A1 | 10/2008 | Shi |
| 2008/0251492 A1 | 10/2008 | Shi |
| 2008/0287027 A1 | 11/2008 | Suzuki et al. |
| 2008/0299857 A1 | 12/2008 | Harding et al. |
| 2008/0300567 A1 | 12/2008 | Ohnishi et al. |
| 2008/0311815 A1 | 12/2008 | Gupta et al. |
| 2009/0068419 A1 | 3/2009 | Pascavage |
| 2009/0068420 A1 | 3/2009 | Pascavage |
| 2009/0124153 A1 | 5/2009 | Dharmarajan et al. |
| 2009/0124154 A1 | 5/2009 | Harrington et al. |
| 2010/0081352 A1 | 4/2010 | Westwood |
| 2010/0124864 A1 | 5/2010 | Dharmarajan et al. |
| 2010/0222755 A1 | 9/2010 | Westwood |
| 2010/0222761 A1 | 9/2010 | Westwood et al. |
| 2010/0266818 A1 | 10/2010 | Westwood et al. |
| 2010/0267914 A1 | 10/2010 | Westwood et al. |

FOREIGN PATENT DOCUMENTS

| | | |
|---|---|---|
| EP | 0 277 003 | 8/1988 |
| EP | 0 277 004 | 8/1988 |
| EP | 0 426 637 | 5/1991 |
| EP | 0 432 755 | 6/1991 |
| EP | 0 495 375 | 7/1992 |
| EP | 0 500 944 | 9/1992 |
| EP | 0 520 732 | 12/1992 |
| EP | 0 534 863 | 3/1993 |
| EP | 0 570 982 | 11/1993 |
| EP | 0 573 403 | 12/1993 |
| EP | 1 066 957 | 1/2001 |
| EP | 1 066 961 | 1/2001 |
| EP | 1 070 087 | 1/2001 |
| EP | 1 138 472 | 10/2001 |
| EP | 1 174 257 | 1/2002 |
| EP | 1 614 699 | 1/2006 |
| EP | 1 712 351 | 10/2006 |
| EP | 1 834 015 | 9/2007 |
| EP | 1 877 237 | 1/2008 |
| EP | 1 980 390 | 10/2008 |
| JP | 04-352865 | 12/1992 |
| JP | 05-321115 | 12/1993 |
| JP | 02/105833 | 4/2002 |
| JP | 2005/171456 | 6/2005 |
| JP | 4753852 | 8/2007 |
| JP | 2007-277755 | 10/2007 |
| WO | WO 91/09882 | 7/1991 |
| WO | WO 92/00333 | 1/1992 |
| WO | WO 92/16361 | 10/1992 |
| WO | WO 92/16366 | 10/1992 |
| WO | WO 94/03506 | 2/1994 |
| WO | WO 94/26816 | 11/1994 |
| WO | WO 98/39384 | 9/1998 |
| WO | WO 00/01745 | 1/2000 |
| WO | WO 00/18994 | 4/2000 |
| WO | WO 00/37723 | 6/2000 |
| WO | WO 00/38911 | 7/2000 |
| WO | WO 01/00915 | 1/2001 |
| WO | WO 01/00917 | 1/2001 |
| WO | WO 02/34511 | 5/2002 |
| WO | WO 02/36651 | 5/2002 |
| WO | WO 03/040201 | 5/2003 |
| WO | WO 2004/038078 | 5/2004 |
| WO | WO 2005/049672 | 6/2005 |
| WO | WO 2006/101631 | 9/2006 |
| WO | WO 2007/030170 | 3/2007 |
| WO | WO 2007/140163 | 12/2007 |
| WO | WO 2007/142736 | 12/2007 |
| WO | WO 2008/094337 | 8/2008 |
| WO | WO 2009/064583 | 5/2009 |
| WO | WO 2009/126712 | 10/2009 |
| WO | WO 2010/001273 | 1/2010 |
| WO | WO 2010/039579 | 4/2010 |
| WO | WO 2010/039583 | 4/2010 |
| WO | WO 2010/098792 | 9/2010 |
| WO | WO 2010/098793 | 9/2010 |
| WO | WO 2011/041575 | 4/2011 |

OTHER PUBLICATIONS

Rooney, J.G. et al., "*On Line Determination by Light Scattering of Mechanical Degradation in the GPC Process*", Liquid Chromatography of Polymers and Related Materials III, Cazes, J. Ed., Marcel Dekker, pp. 207-234 (1981).

Chapman, R., "*Nonwoven Fabrics, Staple Fibers*", Kirk-Othmer Encyclopedia of Chemical Technology, John Wiley & Sons, pp. 1-27 (2005).

Cheng, H. N. "$^{13}C$ *NMR Analysis of Ethylene-Propylene Rubbers*", Macromolecules, vol. 17, pp. 1950-1955 (1984).

Index05 Daily News, Apr. 14, 2005, in association with Nonwovens Report International, pp. 4.

Index08, Geneva Palexpo, Apr. 15-18, 2008, Biax-Fiberfilm Corporation.

E. P. Moore, Jr. ed., "9.2.1.1 Melt-Blown Fibers," in Polypropylene Handbook, Polymerization, Charaterization, Properties, Processing, Applications, pp. 314-324.

Prabhu, P. et al., "*Evidence for Ethylene-Propylene Block Copolymer Formation*", J. Poly. Sci.: Polymer Letters Ed., vol. 18, pp. 389-394 (1980).

Rudnick, L.R. et al., "*Poly(α-olefins)*", Synthetic Lubricants and High Performance Functional Fluids, $2^{nd}$ Edition, Marcel Dekker, Inc., pp. 3-52 (1999).

Seyam, A.M.et al., "*An Examination of the Hydroentangling Process Variables*", in Int'l Nonwovens J., pp. 25-33 (Spring 2005).

Ver Strate, G. et al., "*Near Monodisperse Ethylene-Propylene Copolymers by Direct Ziegler-Natta Polymerization. Preparation, Characterization, Properties*", Macromolecules, vol. 21, pp. 3360-3371 (1988).

Zhao, R., "*Melt Blowing Polyoxymethylene Copolymer*", in Int'l Nonwovens J., pp. 19-24 (Summer 2005).

Zhao, R., "Stretching the Value of Melt Blown with Cellulose Microfiber and Elastic Resin," A Paper for Insight 2004, Austin, Texas, USA, Oct. 10-14, 2004, Biax Fiberfilm Corporation, Greenville, Wisconsin, pp. 1-13.

Dharmarajan, N. et al., "*Tailoring the Performance of Specialty Polyolefin Elastomer Based Elastic Nonwoven Fabrics*", INTC® 2006, International Nonwovens Technical Conference, Conference Proceedings, Houston, TX, United States, Sep. 25-28, 2006.

(56) References Cited

OTHER PUBLICATIONS

Dutta, S. et al., "*More Efficient Manufacture of Controlled-rheology Polypropylene*", Society of Plastics Engineers, Plastics Research Online (2010).

Harringgton, B.A. et al.,"*Processability and Fabric Attributes of Specialty Polyolefin Elastomers*", INTC® 2005, International Nonwovens Technical Conference, Conference Proceedings, St. Louis, MS, United States, Sep. 19-22, 2005.

Kacker, S. et al., "*Properties of Elastic Nonwoven Fabrics Based Upon Specialty Polyolefin Elastomers*", INTC® 2006, International Nonwovens Technical Conference, Conference Proceedings, Houston, TX, United States, Sep. 25-28, 2006.

Srivatsan, S. et al., "*Novel Polyolefin Resin for Elastic Spunbond & Melt Blown Applications*", INTC® 2004, Toronto, Canada, Sep. 20-23, 2004.

VISTAMAXX™ 2120 Propylene-based Elastomer, data sheets. <URL: www.specialtyelastomers.com>.

VISTAMAXX™ Specialty Elastomers for Meltblown Fabrics, data sheet. <URL: www.vistamaxxelastomers.com.

VISTAMAXX™ Specialty Elastomers VM2320, data sheet. <URL: www.vistamaxxelastomers.com.

VISTAMAXX™ Specialty Elastomers for Spunbond Fabrics, data sheet. URL: www.vistamaxxelastomers.com.

VISTAMAXX™ Specialty Elastomers—Unlimited Creative Potential. Imagine That! URL: www.vistamaxxelastomers.com.

Wheeler, L.M. et al., "*Gel Permeation Chromatography/Fourier Transform Infrared Interface for Polymer Analysis*", Applied Spectroscopy, vol. 47, No. 8, pp. 1128-1130 (1993).

\* cited by examiner

MULTI-LAYER NONWOVEN IN SITU LAMINATES AND METHOD OF PRODUCING THE SAME

CROSS-REFERENCE TO RELATED APPLICATIONS

The present application claims priority from U.S. Ser. No. 61/171,135, filed Apr. 21, 2009, and U.S. Ser. No. 61/156,078, filed Feb. 27, 2009, all of which are incorporated by reference in their entirety. This application is related to international patent application nos. PCT/US2009/58263, and PCT/US2009/58250, and PCT/US2009/58230, concurrently filed on Sep. 24, 2009, which are all incorporated by reference in their entirety.

FIELD OF THE INVENTION

The present disclosure relates to nonwoven fabric laminates, and in particular to a method of forming laminates of nonwoven fabrics that may include at least one polyolefin-based elastic layer, wherein the formation of each layer occurs simultaneously from a single die such that the layers are bound through entanglement across an interfacial region.

BACKGROUND OF THE INVENTION

The disposable hygiene market desires a highly elastic, breathable, nonwoven fabric with the necessary aesthetic qualities, and preferably fabrics that require no form of mechanical activation, all while being cost effective. Existing products tend to be layered composite structures comprised of an elastic film (typically a styrenic block copolymer ("SBC")) that has skin layers coextruded or otherwise laminated onto the film to prevent blocking. The skin layers used are typically inelastic, nonwovens in order to provide the correct aesthetic (a soft, fluffy, cushion-like texture). In certain constructions a hot melt glue layer is used to bond the nonwoven to either side of the elastic film, and in other constructions an inelastic film layer is used to create a dead-zone for attachment purposes. Once these composite structures are formed they are typically not elastic due to the constraining influence of the inelastic components such as the skin layers, glue, and nonwoven facing layers.

In order to remove the constraining influence, these composites require a mechanical stretching or activation step in order to stretch or break the nonelastic components, removing the constraint and creating an elastic composite controlled by the elastic film. Also, the products require the film to be apertured in order to make these layered structures breathable. This process involves the controlled puncturing/tearing of the film with the associated concerns for film failure and increased scrap rates.

Recently, film composites have arrived in the market that do not require mechanical activation. These products still comprise a SBC film with one or more highly extensible spunlaced facing layers attached to either side of the film using thin lines of hot melt glue. Because the film does not have a coextruded skin, the regions between the glued areas are not constrained and are therefore elastic as the nonwoven is extensible and non-restraining. However, these products are not breathable, require adhesives and like all of the film composite products are costly to produce.

A solution to the above problem is to modify commercially available meltspun lines to produce in-situ a multilayer laminate fabric from a single die. For example, the modification of the meltspinning die could allow for the formation of a three-layer ABA in-situ laminate fabric having high loft, extensible "A" layers made from polymers with a desirable hand that are joined to the "B" layer comprised of a highly elastic propylene-based elastomers. Since they are produced side-by-side simultaneously, the fabric layers would be joined to one another through fiber-fiber entanglement across an interfacial layer between the two fabric layers. This would result in a fabric that is highly elastic, breathable and has the desired aesthetic qualities.

Some related disclosures include EP 1 712 351 A, U.S. Pat. No. 4,380,570, U.S. Pat. No. 5,476,616, U.S. Pat. No. 5,804,286, U.S. Pat. No. 5,921,973, U.S. Pat. No. 6,080,818, U.S. Pat. No. 6,342,565, U.S. Pat. No. 6,417,121, U.S. Pat. No. 6,444,774, U.S. Pat. No. 6,506,698, U.S. Pat. No. 7,026,404, U.S. Pat. No. 7,101,622, US 2003/0125696, US 2005/0106978, US 2006/0172647, U.S. Pat. No. 6,342,565, US 2005/0106978, US 2005/0130544, US 2006/0172647, US 2008/0182116, US 2008/0182940, US 2008/0182468, U.S. Ser. No. 11/655,399, and R. Zhao, "Melt Blowing Polyoxymethylene Copolymer" in INT'L NONWOVENS J., 19-24 (Summer 2005).

SUMMARY OF THE INVENTION

Described herein is a meltspun laminate comprising two or more layers of meltspun fabrics, wherein layers that are adjacent to one another are in situ entangled with one another to define an interfacial region of mixed fibers between the layers. Such a material is referred to herein as an "in situ laminate" or "ISL". In one embodiment, the fabrics are meltblown fabrics.

Also described herein is a method of making a meltspun in situ laminate comprising simultaneously meltspinning two or more polymer melts adjacent to one another to form adjacent fabrics, wherein layers that are adjacent to one another are in situ entangled with one another to form an interfacial region of mixed fibers between the layers.

Also described herein is a meltspinning apparatus comprising one or more dies, each die comprising two or more meltspinning zones, wherein each zone comprises a plurality of nozzles that are fluidly connected to the corresponding zone, and wherein each zone is fluidly connected to a melt extruder. Each extruder may contain any number of elastomers, thermoplastics, or blends thereof for melt extruding into its corresponding meltspinning zone.

The various descriptive elements and numerical ranges disclosed herein can be combined with other descriptive elements and numerical ranges to describe preferred embodiments of the in situ laminates and composites thereof; further, any upper numerical limit of an element can be combined with any lower numerical limit of the same element to describe preferred embodiments. In this regard, the phrase "within the range from X to Y" is intended to include within that range the "X" and "Y" values.

DETAILED DESCRIPTION

Definitions

As used herein, a "nonwoven fabric" (or "fabric") is a textile structure (e.g., a sheet, web, or batt) of directionally or randomly orientated fibers, without a yarn being first made or involving a weaving or knitting process. The fabrics described herein comprise a network of fibers or continuous filaments that may be strengthened by mechanical, chemical, or thermally interlocking processes. Examples of nonwoven fabrics include meltspun fabrics (made by meltspinning processes), carded fabrics, dry-laid fabrics (e.g., carded fabrics or air-laid fabrics) and wet-laid fabrics. Any of these types of fabrics may be physically entangled by means known in the art and are often termed "spunlaced" fabrics.

As used herein, a "meltspun fabric" refers to a fabric made by a method wherein a web of fibers is formed from a polymeric melt or solution that is extruded through small holes or spinneret nozzles from one or more dies to form thin filaments which are then attenuated by an appropriate means such as by high pressure air and laid down on a moving screen, drum or other suitable device. "Meltspinning" processes include, but are not limited to, spunbonding, solution spinning, coforming, and meltblowing. Meltspun fibers typically have an average diameter of less than 250 or 150 or 60 or 40 µm. Non-limiting examples of suitable polymers used to make meltspun fibers are polypropylene (e.g., homopolymers, copolymers, impact copolymers), polyester (e.g., PET), polyamide, polyurethane (e.g., Lycra™), polyethylene (e.g., LDPE, LLDPE, HDPE, plastomers), polycarbonate, and blends thereof.

As used herein, "spunbond" refers to a meltspinning method of forming a fabric in which a polymeric melt or solution is extruded through spinnerets to form filaments which are cooled and attenuated by suitable means such as by electrostatic charge or high velocity air, the attenuated filaments ("fibers") are then laid down on a moving screen to form the fabric. The laid down fibers may optionally be passed through heated calenders or some other suitable means to bond the fibers together. In certain embodiments, the attenuating air in spunbond processes is at less than about 50° C. Fibers resulting from a spunbond process typically have some degree of uniaxial molecular orientation imparted therein.

As used herein, "meltblown" refers to a meltspinning method of forming a fabric in which a polymeric melt or solution is extruded through spinnerets to form filaments which are attenuated by suitable means such as by electrostatic charge or high velocity air, such attenuated filaments ("fibers") are then laid down on a moving screen to form the fabric. In certain embodiments there may or may not be a separate quench air source. In certain embodiments, the attenuating air in meltblown processes is at greater than about 50° C.

The fibers themselves may be referred to as being "spunbond" or "meltblown." Spunbond and meltblown fibers may have any desirable average diameter, and in certain embodiments are within the range from 0.1 or 1 or 4 to 15 or 20 or 40 or 50 or 150 or 250 µm, or expressed another way, a denier (g/9000 m) of less than 5.0 or 3.0 or 2.0 or 1.9 or 1.8 or 1.6 or 1.4 or 1.2 or 1.0.

As used herein, the term "coform" refers to another melt-spinning process in which at least one meltspun die head is arranged near a chute through which other materials are added to the fabric while it is forming. Such other materials may be pulp, superabsorbent particles, cellulose or staple fibers, for example. Coform processes are shown in U.S. Pat. No. 4,818,464 and U.S. Pat. No. 4,100,324, herein incorporated by reference. For purposes of this disclosure, the coform process is considered a particular embodiment of meltspun processes.

As used herein, a "fiber" is a structure whose length is very much greater than its diameter or breadth; the average diameter is on the order of 0.1 to 350 µm, and comprises natural and/or synthetic materials. Fibers can be "mono-component" or "bi-component". Bicomponent fibers comprise two or more polymers of different chemical and/or physical properties extruded from separate extruders but through the same spinneret with both polymers within the same filament, resulting in fibers having distinct domains comprised of each different polymer. The configuration of such a bicomponent fiber may be, for example, sheath/core arrangement wherein one polymer is surrounded by another or may be side-by-side as in U.S. Pat. No. 5,108,820, herein incorporated by reference, segmented or "pie" wherein the different domains of the polymers are in alternating segments in the shape of "pie slices", or "islands in the sea" such as in U.S. Pat. No. 7,413,803, herein incorporated by reference. Fibers can also be "mono-constituent" or "bi-constituent", meaning that they are made of a single polymer or a blend of two or more polymers.

As used herein, an "in situ laminate" (or "ISL") refers to a structure that comprises at least two fabric layers that are made by the in situ meltspinning process described further below. A "composite" refers to a structure that comprises at least one ISL and at least one other layer of material such as a film, another fabric, or another ISL made from any suitable material. The composites may be made, for example, by sequentially depositing onto a moving forming belt first a meltspun fabric layer, then depositing another meltspun fabric layer or adding a carded or dry-laid fabric on top of the first meltspun fabric layer, then adding a meltspun fabric layer on top of those layers, followed by some bonding of the various layered materials, such as by thermal point bonding or the inherent tendency of the layers to adhere to one another, hydroentangling, etc. Alternatively, the fabric layers may be made individually, collected in rolls, and combined in a separate bonding step or steps. The ISLs and composites may also have various numbers of layers in many different configurations and may include other materials like films, adhesives, textile materials, absorbent materials, (e.g., pulp, paper, SAP etc), coform materials, meltblown and spunbond materials, or air-laid materials, etc.

As used herein, materials and/or fabrics referred to as being "elastic" or "elastomeric" are those that, upon application of a biasing force, can stretch to an elongated length of at least 100% of its relaxed, original length without rupture or breakage, but upon release of the biasing force the material shows at least 40% or more recovery of its elongation. Suitable elastomeric materials are described further herein. A material, such as a fabric, is "extensible" if upon application of a biasing force the material can stretch to an elongated length of at least 100% of its relaxed, original length without rupture or breakage, but upon release of the biasing force the material shows less than 40% recovery of its elongation. Extensible fabrics often accompany elastomeric fabric or film layers of common articles (e.g., diapers, etc.) and are formed from a material that is extensible (e.g., polyurethanes, styrenic block copolymers, ethylene vinyl acetates, certain polypropylene copolymers, polyethylenes, and blends thereof), or formed by mechanically distorting or twisting a fabric (natural or synthetic).

As used herein, a "film" is a flat unsupported section of a plastic and/or elastomeric material whose thickness is very narrow in relation to its width and length and has a continuous or nearly continuous macroscopic morphology throughout its structure allowing for the passage of air at diffusion-limited rates or lower. The ISLs described herein may include one or more film layers and can comprise any material as described herein for the fabrics. In certain embodiments, films are absent from the ISLs described herein. Films described herein may contain additives that, upon treatment, promote perforations and allow the passage of air and/or fluids through the film. Additives such as clays, calcium carbonate, etc. are well known in the art and described particularly in U.S. Pat. No. 6,632,212, herein incorporated by reference.

Description of the ISL

Provided in this disclosure is a meltspun ISL comprising two or more layers of meltspun fabrics, wherein layers that are adjacent are in situ entangled with one another such that a finite interfacial zone is created. By "in situ entangled" what is meant is that the fibers of adjacent layers engage one another at least along one edge of adjacent fabric layers as by wrapping around each other and/or one passing at least once through a fiber from an adjacent layer. Preferably in the ISLs, the various layers of the layered structure have not been subjected to air- or hydro-entanglement processes as is known in the art, nor are adhesives used to join the layers. The ISLs described herein comprise layers of meltspun fabrics where the individual fibers from adjacent layers are entangled or intertwined with one another, such arrangement resulting from the entanglement of the forming filaments that are meltspun from the meltspinning apparatus. This is achieved in certain embodiments by meltspinning the two or more layers simultaneously or nearly simultaneously and adjacent to one another from a single die.

The fabric layers that make up the meltspun ISLs may be the same or different, meaning that they may have the same or different chemical and/or physical characteristics. In certain embodiments, the various layers are characterized in that (a) the basis weight of the fabrics is not the same, (b) the average diameter of the fibers making up the fabrics is not the same, (c) the composition of the fabrics is not the same, (d) number density of fibers per unit area in adjacent fabrics is not the same, (e) the cross-sectional shape of the fibers is not the same, (f) the individual fiber structure is not the same (bicomponent versus mono-component), or (g) any combination of one or more of these differences.

The layers that make up the meltspun ISLs may also be characterized by being entangled to a degree that prevents the layers from being easily pulled apart. In certain embodiments, the adjacent layers have a Peel Strength of greater than 10 or 20 or 30 or 40 or 50 grams, or in other embodiments within the range from 1 or 2 or 5 or 10 to 50 or 60 or 80 or 100 or 120 or 150 or 200 grams. Peel Strength referred to herein were determined essentially in accordance with ASTM D2724.13. The procedure was intended to determine the z-direction strength (bond strength) of laminated fabrics. The efficiency of bonding between component layers of a fabric was determined by measuring the force required to delaminate the fabric. Delamination is defined as the separation of the plies of a laminated fabric due to a failure of the bonding mechanism. Peel strength is the tensile force required to separate the component layers of a textile under specified conditions. In this procedure, the plies of a six inch by two inch specimen (six inches in the machine direction) were manually separated for a distance of about two inches along the length of the specimen. One layer was then clamped into each jaw of a tensile testing machine with a gauge length of one inch and the maximum force (i.e., peak load) needed to completely separate the component layers of the fabric was determined.

In certain embodiments, at least one layer of the ISL is elastic. The elastic fabric layer of the ISL may be made from any material that is extrudable in a meltspinning apparatus and is elastic. In one embodiment, the elastic fabric comprises an elastomer selected from the group consisting of propylene-α-olefin elastomer, ethylene-α-olefin random and block copolymers (e.g., Infuse™ elastomers), natural rubber ("NR"), synthetic polyisoprene ("IR"), butyl rubber (copolymer of isobutylene and isoprene, "IIR"), halogenated butyl rubbers (chloro-butyl rubber: "CIIR"; bromo-butyl rubber: "BIIR"), polybutadiene ("BR"), styrene-butadiene rubber ("SBR"), nitrile rubber, hydrogenated nitrile rubbers, chloroprene rubber ("CR"), polychloroprene, neoprene, ethylene-propylene rubber ("EPM"), ethylene-propylene-diene rubber ("EPDM"), epichlorohydrin rubber ("ECO"), polyacrylic rubber (e.g., "ACM", "ABR"), silicone rubber, fluorosilicone rubber, fluoroelastomers, perfluoroelastomers, polyether block amides ("PEBA"), chlorosulfonated polyethylene ("CSM"), ethylene-vinyl acetate ("EVA"), thermoplastic elastomers ("TPE"), thermoplastic vulcanizates ("TPV"), thermoplastic polyurethane ("TPU"), thermoplastic olefins ("TPO") (random and block), polysulfide rubber, or blends of any two or more of these elastomers. The ISL may also comprise a composite material made of a mixture of two or more different fibers or a mixture of fibers and particulates. Such mixtures may be formed by adding fibers and/or particulates to the gas stream in which meltspun fibers are carried so that an intimate entangled commingling of meltspun filaments and fibers and other materials, for example, wood pulp, staple fibers and particulates such as, for example, hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in U.S. Pat. No. 4,100,324, which is incorporated herein by reference. If the nonwoven web is a nonwoven web of fibers, the fibers may be joined by interfiber bonding to form a coherent web structure. Interfiber bonding may be produced by thermal bonding in a spunbonding process, or entanglement between individual meltblown fibers. The fiber entangling is inherent in the meltspinning process but may be generated or increased by processes such as, for example, hydraulic entangling or needlepunching. Alternatively and/or additionally a bonding agent may be used to increase the desired bonding. In certain desired embodiments, neither of these methods are used to increase entanglement.

In a preferred embodiment, the elastic layer comprises from 10 or 20 or 30 or 40 to 50 or 70 or 80 or 90 or 95 or 100%, by weight of the fabric, of a propylene-α-olefin elastomer having an MFR of less than 80 or 60 or 40 or 24 or 20 dg/min. In a particular embodiment, the elastic layer consists essentially of the propylene-α-olefin elastomer.

Propylene-α-Olefin Elastomer

As used herein, a "propylene-α-olefin elastomer" refers to a random copolymer that is elastomeric, has moderate crystallinity and possesses propylene-derived units and one or more units derived from ethylene, higher α-olefins and/or optionally diene-derived units. The overall comonomer content of the copolymer is from 5 to 35 wt % in one embodiment. In some embodiments, where more than one comonomer is present, the amount of a particular comonomer may be less than 5 wt %, but the combined comonomer content is greater than 5 wt %. The propylene-α-olefin elastomers may be described by any number of different parameters, and those parameters may comprise a numerical range made up of any desirable upper limit with any desirable lower limit as described herein.

In certain embodiments, the propylene-α-olefin elastomer comprises ethylene or $C_4$-$C_{10}$ α-olefin-derived units (or "comonomer-derived units") within the range of 5 or 7 or 9 to 13 or 16 or 18 wt % by weight of the elastomer. The propylene-α-olefin elastomer may also comprise two different comonomer-derived units. Also, these copolymers and terpolymers may comprise diene-derived units as described below. In a particular embodiment, the propylene-α-olefin elastomer comprises propylene-derived units and comonomer units selected from ethylene, 1-hexene, and 1-octene. And in a more particular embodiment, the comonomer is ethylene, and thus the propylene-α-olefin elastomer is a propylene-ethylene copolymer. When dienes are present, the propylene-α-olefin elastomer comprises less than 5 or 3 wt %, by weight of the elastomer, of diene derived units, or within the range from 0.1 or 0.5 or 1 to 5 wt % in other embodiments. Suitable dienes include for example: 1,4-hexadiene, 1,6-octadiene, 5-methyl-1,4-hexadiene, 3,7-dimethyl-1,6-octadiene, dicyclopentadiene ("DCPD"), ethylidiene norbornene ("ENB"), norbornadiene, 5-vinyl-2-norbornene ("VNB"), and combinations thereof.

In certain embodiments, the propylene-α-olefin elastomers have a triad tacticity of three propylene units, as measured by $^{13}$C NMR, of 75% or greater, 80% or greater, 82% or greater, 85% or greater, or 90% or greater. In one embodiment, the triad tacticity is within the range from 50 to 99%, and from 60 to 99% in another embodiment, and from 75 to 99% in yet another embodiment, and from 80 to 99% in yet another embodiment, and from 60 to 97% in yet another embodiment. Triad tacticity is determined as follows: The tacticity index, expressed herein as "m/r", is determined by $^{13}$C nuclear magnetic resonance ("NMR"). The tacticity index m/r is calculated as defined by H. N. Cheng in 17 MACROMOLECULES 1950 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Embodiments of the propylene-α-olefin elastomer have a tacticity index m/r ranging from a lower limit of 4 or 6 to an upper limit of 8 or 10 or 12.

In certain embodiments, the propylene-α-olefin elastomers have a heat of fusion ("$H_f$"), determined according to the Differential Scanning Calorimetry ("DSC") procedure described herein within the range from 0.5 or 1 or 5 J/g, to 35 or 40 or 50 or 65 or 75 or 80 J/g. In certain embodiments, the $H_f$ value is less than 80 or 75 or 60 or 50 or 40 J/g. In certain embodiments, the propylene-α-olefin elastomers have a percent crystallinity within the range from 0.5 to 40%, and from 1 to 30% in another embodiment, and from 5 to 25% in yet another embodiment, wherein "percent crystallinity" is determined according to the DSC procedure described herein. The thermal energy for the highest order of polypropylene is estimated at 189 J/g (i.e., 100% crystallinity is equal to 189 J/g). In another embodiment, the propylene-α-olefin elastomer has a crystallinity of less than 40%, and within the range from 0.25 to 25% in another embodiment, and from 0.5 to 22% in yet another embodiment, and from 0.5 to 20% in yet another embodiment.

In certain embodiments, the propylene-α-olefin elastomers have a single peak melting transition as determined by DSC; in certain embodiments the propylene-α-olefin elastomer has a primary peak melting transition at from less than 90° C., with a broad end-of-melt transition at greater than about 110° C. The peak "melting point" ("$T_m$") is defined as the temperature of the greatest heat absorption within the range of melting of the sample. However, the propylene-α-olefin elastomer may show secondary melting peaks adjacent to the principal peak, and/or the end-of-melt transition, but for purposes herein, such secondary melting peaks are considered together as a single melting point, with the highest of these peaks being considered the $T_m$ of the propylene-α-olefin elastomer. The propylene-α-olefin elastomers have a peak $T_m$ from less than 105 or 100 or 90 or 80 or 70° C. in certain embodiments; and within the range from 10 or 15 or 20 or 25 to 65 or 75 or 80 or 95 or 105° C. in other another embodiments.

The procedure for DSC determinations is as follows. About 0.5 grams of polymer was weighed out and pressed to a thickness of about 15-20 mils (about 381-508 microns) at about 140° C.-150° C., using a "DSC mold" and Mylar™ backing sheet. The pressed pad was allowed to cool to ambient temperature by hanging in air (the Mylar™ backing sheet was not removed). The pressed pad was annealed at room temperature (about 23-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two maxima, the maxima at the highest temperature was taken as the melting point within the range of melting of the sample relative to a baseline measurement for the increasing heat capacity of the polymer as a function of temperature.

In certain embodiments, the propylene-α-olefin elastomers have a density within the range from 0.840 to 0.920 g/cm$^3$, and from 0.845 to 0.900 g/cm$^3$ in another embodiment, and from 0.850 to 0.890 g/cm$^3$ in yet another embodiment, the values measured at room temperature per the ASTM D-1505 test method.

In certain embodiments, the propylene-α-olefin elastomers have a melt flow rate ("MFR", ASTM D1238, 2.16 kg, 230° C.), from less than 80 or 70 or 50 or 40 or 30 or 24 or 20 dg/min, and within the range from 0.1 or 1 or 4 or 6 to 12 or 16 or 20 or 40 or 60 or 80 dg/min in other embodiments.

In certain embodiments, the propylene-α-olefin elastomers have a Shore A hardness (ASTM D2240) within the range from 20 or 40 to 80 or 90 Shore A. In yet another embodiment, the propylene-α-olefin elastomers possess an Ultimate Elongation (ASTM D 412) of greater than 500% or 1000% or 2000%; and within the range from 500% to 800 or 1200 or 1800 or 2000 or 3000% in other embodiments.

In certain embodiments, the propylene-α-olefin elastomers have a weight average molecular weight ("Mw") value within the range from 50,000 to 1,000,000 g/mole, and from 60,000 to 600,000 in another embodiment, and from 70,000 to 400,000 in yet another embodiment. The propylene-α-olefin elastomers have a number average molecular weight ("Mn") value within the range from 10,000 to 500,000 g/mole in certain embodiments, and from 20,000 to 300,000 in yet another embodiment, and from 30,000 to 200,000 in yet another embodiment. The propylene-α-olefin elastomers have a z-average molecular weight ("Mz") value within the range from 80,000 to 6,000,000 g/mole in certain embodiments, and from 100,000 to 700,000 in another embodiment, and from 120,000 to 500,000 in yet another embodiment.

In certain embodiments, a desirable molecular weight (and hence, a desirable MFR) is achieved by visbreaking the propylene-α-olefin elastomer. The "visbroken propylene-α-olefin elastomer" (also known in the art as "controlled rheology") is the copolymer that has been treated with a visbreaking agent such that the agent breaks apart the polymer chains. Non-limiting examples of visbreaking agents include peroxides, hydroxylamine esters, and other oxidizing and free-radical generating agents. Stated another way, the visbroken elastomer may be the reaction product of a visbreaking agent and the elastomer. In particular, a visbroken propylene-α-olefin elastomer is one that has been treated with a visbreaking agent such that its MFR is increased, in one embodiment by at least 10%, and at least 20% in another embodiment relative to the MFR value prior to treatment. In certain embodiments, the process of making the fibers and fabrics excludes any visbreaking agents from the extruder and other parts of the apparatus. The propylene-α-olefin elastomer in this case is called a "reactor grade" elastomer. By "excludes" or "excluded," what is meant is that visbreaking agents such as peroxides, hydroxylamine esters, and other oxidizing and free-radical generating agents are not added to the extruder or any other component of the fiber forming apparatus downstream of the extruder. Thus, in this embodiment the elastomer being blown into a fiber and fabric is the elastomer having the desired MFR as introduced into the extruder feeding the fiber forming apparatus.

In certain embodiments, the molecular weight distribution ("MWD") of the propylene-α-olefin elastomers is within the range from 1.5 or 1.8 or 2.0 to 3.0 or 3.5 or 4.0 or 5.0. Techniques for determining the molecular weight (Mn, Mz and Mw) and MWD are as follows, and as in Verstate et al. in 21 MACROMOLECULES 3360 (1988), incorporated herein by reference. Conditions described herein govern over published test conditions. Molecular weight and MWD are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804, and 805 are used. This technique is discussed in LIQUID CHROMATOGRAPHY OF POLYMERS AND RELATED MATERIALS III 207 (J. Cazes ed., Marcel Dekker, 1981), incorporated herein by reference. No corrections for column spreading were employed; however, data on generally accepted standards, for example, National Bureau of Standards, Polyethylene (SRM 1484) and anionically produced hydrogenated polyisoprenes (an alternating ethylene-propylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin elastomers described herein can be produced using any catalyst and/or process known for producing polypropylenes. In certain embodiments, the propylene-α-olefin elastomers can include copolymers prepared according to the procedures in WO 02/36651, U.S. Pat. No. 6,992,158, and/or WO 00/01745. Preferred methods for producing the propylene-α-olefin elastomers are found in US 2004/0236042 and U.S. Pat. No. 6,881,800. Preferred propylene-α-olefin elastomers are available commercially under the trade names Vistamaxx™ (ExxonMobil Chemical Company, Houston, Tex., USA) and Versify™ (The Dow Chemical Company, Midland, Mich., USA), certain grades of Tafmer™ XM or Notio™ (Mitsui Company, Japan) and certain grades of Softel™ (Basell Polyolefins of the Netherlands).

Although the "propylene-α-olefin elastomer" component of the fiber and fabric compositions is sometimes discussed as a single polymer, also contemplated by the term are blends of two or more different propylene-α-olefin elastomers having the properties within the ranges described herein.

Meltspinning Process

The formation of the meltspun ISLs requires the manufacture of fibers by extrusion followed by spinning through a meltspinning apparatus that includes at least one die capable of handling the appropriate melt temperatures and pressures to spin fine denier fibers. In particular, the apparatus has at least one die comprising multiple nozzles, each fluidly connected to its own extruder to allow different materials to be meltspun through the nozzles. The nozzle defines a narrow orifice through which the molten polymer is meltspun into a filament. Each die can have any number of nozzles, the nozzle density ranging from 20 or 40 or 50 nozzles/in to 120 or 150 or 200 or 300 or 350 nozzles/inch. The extrusion process is typically accompanied by mechanical or aerodynamic drawing of the fibers. The ISLs described herein may be manufactured by any technique known in the art capable of meltspinning extrudable polymers. In one embodiment, the meltspun ISLs are meltspun from an apparatus that can operate at a melt pressure from greater than 200 psi (1.38 MPa) or 500 psi (3.45 MPa) and a melt temperature within the range from 50 and 350° C.

In certain embodiments, the process of making the ISLs and fabrics excludes any visbreaking agents from the meltblowing extruder and other parts of the apparatus. By "excludes" or "excluded," what is meant is that visbreaking agents such as peroxides, hydroxylamine esters, and other oxidizing and free-radical generating agents are not added to the extruder or any other component of the apparatus downstream of the extruder in the meltblowing apparatus. Thus, the copolymer being blown into a fiber and fabric is the copolymer having the desired MFR as introduced into the extruder feeding the meltblowing apparatus.

Examples of suitable meltspinning equipment that may be modified for producing the ISLs (and the fibers that make up the fabrics) described herein are in U.S. Pat. No. 4,380,570, U.S. Pat. No. 5,476,616, US 2004/0209540, and by R. Zhao, "Melt Blowing Polyoxymethylene Copolymer" in INT'L NONWOVENS J., 19-24 (Summer 2005), incorporated herein by reference. Equipment capable of meltblowing is used in certain embodiments. A desirable apparatus will typically include at least one extruder, and may include a gear pump to maintain melt pressure within the apparatus. The extruder is coupled to at least one die block, or array die, such that the melt from the extruder can be transferred to the die block. In the present case, the apparatus has at least one die having multiple nozzles, each fluidly connected to its own extruder to allow different materials to be meltspun through the nozzles and/or allow spinning of the melt at different throughputs. In another arrangement, there may be more than one array die, each die coupled to an extruder and/or capable of spinning the melt at different throughputs. The array die includes a spinneret portion and is coupled also to at least one air manifold for delivering high pressure air to the spinneret portion of the die. The spinneret includes a plurality of spinning nozzles through which the melt is extruded and simultaneously attenuated with air pressure to form filaments, or fibers.

The meltblown fibers that form one or more layers of the ISLs herein are formed by extruding the molten copolymer through a plurality of fine, usually circular, die capillaries or "spinning nozzles" as molten threads or filaments into converging or parallel, usually hot and high velocity, gas stream(s) (e.g., air or nitrogen) to attenuate the filaments of molten thermoplastic material and form fibers. During the meltspinning process, the diameters of the molten filaments are typically reduced by the drawing air to a desired size. Thereafter, the meltblown fibers are carried by the high velocity gas stream and are deposited on a collecting surface to form at least one web of randomly disbursed meltblown fibers. The meltspun fibers may be continuous or discontinuous and are generally within the range from 0.5 to 350 µm in average diameter.

More particularly, in the meltspinning process useful for forming the elastic meltblown fabrics, molten polymer is provided to at least one array die that is disposed between a pair of air plates, one being the top plate, that form one or more primary air nozzles. In one embodiment, the meltblowing apparatus includes an array die with a plurality of spinneret nozzles (or "nozzles"), the nozzle density within the range from 20 or 30 or 40 to 200 or 250 or 320 nozzles/inch. In one embodiment, each nozzle has an inside diameter within the range from 0.05 or 0.10 or 0.20 to 0.80 or 1.00 or 2.00 mm. The air plates in one embodiment are mounted in a recessed configuration such that the tips of the spinning nozzles are set back from the primary air nozzle. In another embodiment, air plates are mounted in a flush configuration where the air plate ends are in the same horizontal plane as the tip of the spinning nozzles. In yet other embodiments, the spinning nozzle tips are in a protruding or "stick-out" configuration so that the tip of the spinning nozzles extends past the ends of the air plates. Moreover, more than one air stream can be provided for use in the nozzles.

In one embodiment, hot air ("primary air") is provided through the primary air nozzle located at least on each side or around the circumference of the die tip or around each nozzle. The hot air heats the die and thus prevents the die from becoming clogged with solidifying polymer as the molten polymer exits and cools. The hot air also draws, or attenuates, the melt into fibers. The primary air may flow parallel to the forming molten filaments, or at any angle up to being perpendicular to the forming filaments, and preferably, the primary air flow is within the range from parallel (0°) to an angle of about 30°. In certain embodiments the primary air pressure in the meltblown process typically ranges from 2 or 5 to 10 or 15 or 20 or 30 pounds per square inch gauge (psig) at a point in the die head just prior to exit. Primary air temperatures are typically within the range from 200 or 230 to 300 or 320 or 350° C. in certain embodiments, and attenuated with air at a temperature of greater than 50 or 80 or 100 or 150° C. in other embodiments. Primary air flow rates typically range from 5 or 10 or 20 to 24 or 30 or 40 standard cubic feet per minute per inch of die width (SCFM/inch).

Secondary, or quenching, air at temperatures above ambient can also be provided through the die head(s). Alternatively, a water quench can also be applied to the fibers upon immediately existing the spinning nozzles.

The melt temperature of the polymers used to make the meltspun ISLs described herein is from greater than that to form a melt of the polymer (and any other additives) and below the decomposition temperature of the polymers (and any other additives), and in certain embodiments is within the range from 50 or 100 or 150° C. to 250 or 280 or 350° C. In yet other embodiments, the melt temperature is from less than 150 or 200 or 220 or 230 or 250 or 260 or 270 or 280° C. The polymer is formed into fibers at a melt pressure from greater than 200 psi (1.38 MPa) or 500 psi (3.45 MPa) or 750 psi (5.17 MPa) or 1000 psi (6.89 MPa), or within the range from 200 psi (1.38 MPa) or 500 psi (3.45 MPa) or 750 psi (5.17 MPa) to 1000 psi (6.89 MPa) or 2000 psi (13.78 MPa) in other embodiments. Thus, the meltspinning apparatus must be able to generate and withstand such pressures to spin, for example, the propylene-α-olefin copolymer into the fabrics and ISL described herein.

Expressed in terms of the amount of molten polymer flowing per inch of the die per unit of time, throughputs for the manufacture of elastic meltblown fabrics using the compositions described herein are typically within the range from 0.1 or 0.2 or 0.3 to 1.0 or 1.25 grams per hole per minute (ghm). Thus, for a die having 30 nozzles per inch, polymer throughput is typically about 0.4 to 1.2 or 3.2 or 4 or 5 lbs/inch/hour ("PIH").

Because such high temperatures can be used, a substantial amount of heat is desirably removed from the fibers in order to quench, or solidify, the fibers leaving the nozzles. Cold gases of air or nitrogen can be used to accelerate cooling and solidification of the meltspun filaments. In particular, cooling ("secondary") air flowing in a cross-flow direction (perpendicular or angled) relative to the direction of fiber elongation, may be used to quench the meltspun fibers and be used to control the diameter of the fibers. Also, an additional, cooler pressurized quench air may be used and can result in even faster cooling and solidification of the fibers. In certain embodiments, the secondary cold air flow may be used to attenuate the fibers. Through the control of air and array die temperatures, air pressure, and polymer feed rate, the diameter of the fiber formed during the meltspun process may be regulated.

Figure 1:
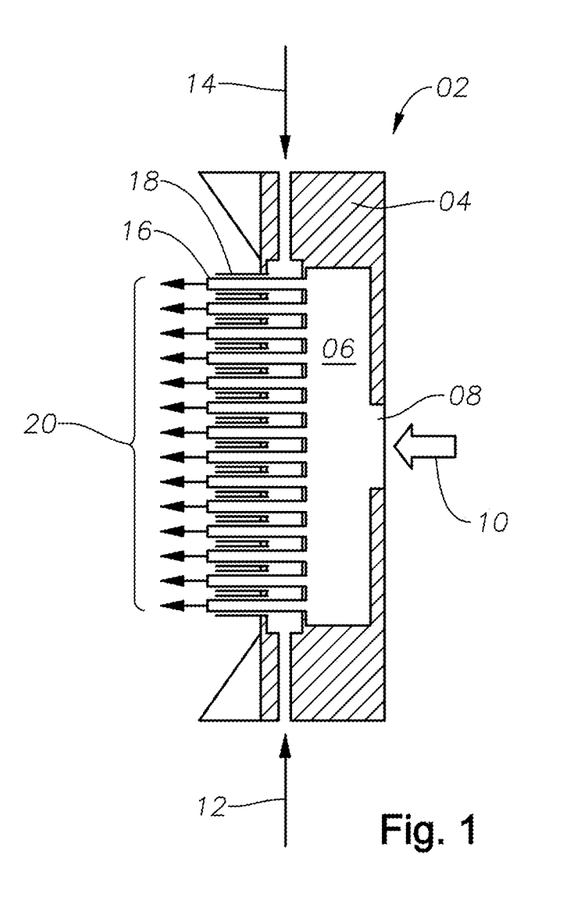
FIG. 1 is a cross-sectional view of a meltspinning array die having spinneret nozzles all fluidly connected to a single zone.

A typical meltspinning die comprising a single zone defined by a cavity, and fluidly connected to a plurality of spinneret nozzles, is shown in FIG. 1. In this apparatus, a single type of fabric having a single set of desired properties (fiber diameter, basis weight, etc.) is produced. Referring to FIG. 1, the apparatus 02 comprises a die block 04 comprising one opening 08 to allow molten polymer 10 to enter the chamber formed by zone 06. Filaments 20 of the molten polymer are formed when the pressure inside of zone 06 forces the molten polymer through the spinneret nozzles 16. The spinneret nozzles 16 in the embodiment of FIG. 1 are each surrounded by a larger concentric duct 18 through which air, preferably heated (such as described for "primary air" used for attenuation of the filaments), flows parallel to the forming filaments 20 are converges at some angle from the opening at duct 18 outward. The primary air, heated or not, can be provided through channels 12 and 14 which are fluidly connected to the air ducts 18. Of course, the filaments 20 ultimately will quench and entangle to form a fabric that comprises the polymer material provided as molten polymer 10.

Figure 2:
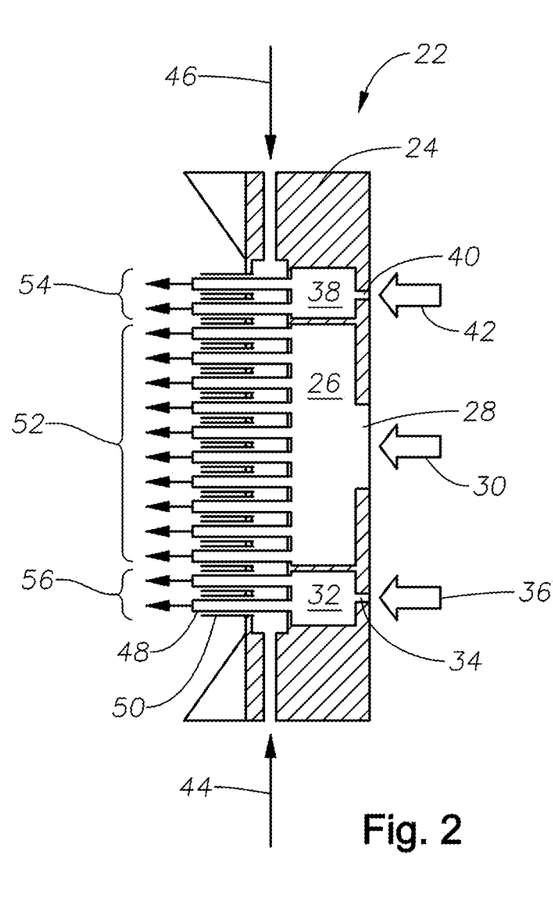
FIG. 2 is a cross-sectional view of one embodiment of a meltspinning array die comprising three meltspinning zones suitable for making a three-layer in situ laminate with the same or different materials.

A particular embodiment of a meltspinning die suitable for forming the ISLs described herein is detailed with reference to FIG. 2. Shown in FIG. 2 is a meltspinning apparatus 22 comprising one die 24, the die comprising three meltspinning zones 26, 32 and 38, wherein each zone comprises a plurality of nozzles 52, 54 and 56, respectively, that are fluidly connected to the corresponding zone, and wherein each zone is fluidly connected to a melt extruder through openings 28, 40 and 34, respectively. As in the apparatus 02 in FIG. 1, molten polymer provided from extruders, and optionally aided by a gear pump, is pumped through openings 28, 26 and 38 as molten flows 30, 36 and 42, respectively. Each flow 30, 36 and 42 may be the same or different as described herein for the corresponding finished product. The molten polymer is then forced by pressure through the spinneret nozzles 48 to form filaments of molten polymer. Though the set of spinneret nozzles 48 that are fluidly connected to zone 26, one fabric if formed from filaments 52 that will be entangled with adjacent filaments. Likewise, though the set of spinneret nozzles 48 that are fluidly connected to zone 38, a fabric is formed from filaments 54 that are entangled with the fabric formed from filaments 52. Finally, though the set of spinneret nozzles 48 that are fluidly connected to zone 32, a fabric if formed from filaments 56 that are entangled with filaments 52. As shown in the embodiment of FIG. 2, primary air, heated or not, passes through channels 44 and 46 which are fluidly connected to concentric air ducts 50. The pressure in zones 26, 32 and 38, as well as the temperature and other variables can be independently controlled, thus influencing the properties of the final product. In this embodiment, the throughput, fiber diameter, etc. of material in each zone can be independently controlled, as can the material to be extruded and spun. However, a suitable meltspinning apparatus for making the ISLs described herein is not limited to only one die, as there can be multiple dies each fluidly connected to its own melt extruder.

In FIG. 2, the propylene-α-olefin elastomer is extruded into the die into a central zone having a plurality of nozzles. Any one or a blend of polypropylene and/or PET and/or polyethylene is extruded into adjacent zones on either side of the central zone. The materials are then meltspun through the nozzles where some of the forming filaments can entangle with one another, while still maintaining a distinct three-layer structure having the elastomer sandwiched between two thermoplastic facing layers. A means for allowing primary air flow is provided in this embodiment of a meltspinning die such that the air flows parallel or nearly parallel with forming filaments and attenuates the filaments as they form into fibers.

The ISLs can have any number of properties as defined in part by its bulk properties, or those of the fibers that make up the fabrics therein. In certain embodiments, meltspun fibers described herein have an average diameter of greater than 4 or 6 or 8 or 10 or 12 μm, and in other embodiments have an average diameter from less than 80 or 50 or 40 or 30 or 20 or 10 or 5 μm. In yet another embodiment, the fibers that make up the ISL have an average diameter within the range from 5 or 6 or 8 or 10 to 20 or 50 or 80 or 100 or 150 or 200 or 250 μm.

After or during cooling, the meltspun fibers are collected to form a layered structure or ISL. In particular, the fibers are collected on any desirable apparatus as is known in the art such as a moving mesh screen, moving belt or collecting (smooth or patterned/embossed) drum(s) located below or across from the nozzles. In order to provide enough space beneath the spinning nozzles for fiber forming, attenuation and cooling, forming distances from 3 inches to 2 feet or more between the polymer nozzle tips and the top of the mesh screen or collecting drum are desired. In certain embodiments, the fibers of the layers are not bound to one another by a secondary process.

The In Situ Laminate

Adjacent zones of filaments that may be distinct chemically, physically, or both, can be spun to form a layered structure (or laminate) that is entangled in situ, or in other words, forming an "in situ laminate". In certain embodiments the ISLs disclosed herein comprise at least one elastic layer but can also comprise any number of other layers such as "facing layers" as are known in the art. Such layers can add a soft feel to the fabrics and/or provide extensibility to allow the elastic fabric layer to stretch and retract. There can be, however, two, three, four or more layers of fabric adjacent to the elastic layer. In a particular embodiment, the two or more layers of the meltspun fabrics comprise at least two facing layers and an elastic layer, the elastic fabric layer located between the two facing layers.

The facing layers can be comprised of mono-constitutent or biconstituent fibers and made from any material that can be meltspun, is extensible, or any material that can be made extensible through mechanical means. In certain embodiments, the facing fabric layers comprise a material selected from the group consisting of polypropylene (e.g., homopolymers, impact copolymers, copolymers), polyethylene (e.g., LDPE, LLDPE, HDPE (copolymers and block copolymers)), functionalized polyolefins (e.g., Exxelor™ maleic anhydride functionalized elastomeric ethylene copolymers), plastomers (e.g., ethylene-α-olefin copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics (e.g., Rayon™, Lyocell™, Tencil™), an elastomer, poly(acetylene), poly(thiophene), poly(aniline), poly(fluorene), poly(pyrrole), poly(3-alkythiophene), poly(phenylene sulphide), polynaphthalenes, poly(phenylene vinylene), poly(vinylidene fluoride), and blends of any two or more of these materials. In certain embodiments, where there is no elastic layer in the ISL, all of the layers may comprise one or a blend of these materials.

In certain embodiments, the elastic layer may also comprise a blend of a thermoplastic type of material (non-elastic) and an elastic material. Thus, for example, the elastic layer may be a blend in any suitable proportion of the propylene-α-olefin elastomer and a polypropylene homopolymer or a polyethylene. Other materials that can be blended with the elastic material include, but are not limited to, plastomers (e.g., ethylene-α-olefin copolymers and block copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics (e.g., Rayon™, Lyocell™, Tencil™), an elastomer, poly(acetylene), poly(thiophene), poly(aniline), poly(fluorene), poly(pyrrole), poly(3-alkythiophene), poly(phenylene sulphide), polynaphthalenes, poly(phenylene vinylene), poly(vinylidene fluoride), and blends of any two or more of these materials.

In one exemplary ISL, the ISL comprises at least two facing layers made from polypropylene (e.g., ExxonMobil SFT 315) and one elastic layer made from a propylene-α-olefin elastomer (e.g., Vistamaxx specialty elastomer 6202, MFR of 18 dg/min), wherein the facing layers sandwich the elastic layer.

Another exemplary embodiment of an ISL includes facing layers made from a metallocene propylene homopolymer (e.g., Achieve™ 6936 Polypropylene) and an elastic layer of a propylene-α-olefin elastomer.

Another exemplary embodiment includes a propylene-α-olefin elastomer sandwiched between layers of an EPDM (e.g., Vistalon™ 7001 Ethylene Propylene Diene Terpolymer). Yet another exemplary embodiment includes propylene-α-olefin elastomer sandwiched between layers of polyethylene.

Yet another exemplary embodiment of an ISL includes propylene-α-olefin elastomer fabric layer sandwiched between fabric layers of polyethylene terephthalate.

Yet another exemplary embodiment of an ISL includes propylene-α-olefin elastomer fabric layer sandwiched between fabric layers of a blend of polyethylene terephthalate and a polypropylene homopolymer.

Yet another exemplary embodiment of an ISL includes propylene-α-olefin elastomer fabric sandwiched between fabric layers of a blend of polyethylene and a polypropylene homopolymer.

Yet another exemplary embodiment of an ISL includes a fabric layer formed from a blend of a propylene-α-olefin elastomer and a polypropylene sandwiched between layers of fabrics made from a blend of polyethylene and a polypropylene homopolymer.

Yet another exemplary embodiment of an ISL includes a propylene-α-olefin elastomer fabric layer sandwiched between layers of fabric made from bicomponent fibers of a polypropylene core and a polyethylene sheath.

Yet another exemplary embodiment of an ISL includes a fabric layer formed from a blend of a propylene-α-olefin elastomer and a polypropylene that is sandwiched between layers of fabric made from bicomponent fibers of a polypropylene core and a polyethylene sheath.

Yet another exemplary embodiment of an ISL includes a fabric layer formed from a blend of a propylene-α-olefin elastomer and a polypropylene sandwiched between fabric layers of a blend of polypropylene and polyethylene terephthalate.

Yet another exemplary embodiment of an ISL includes two facing fabric layers made from bicomponent fibers of a propylene-α-olefin elastomer and a polypropylene and a central fabric layer of propylene-α-olefin elastomer.

Yet another exemplary embodiment of an ISL includes a blend of a propylene-α-olefin elastomer and a polypropylene to form facing layers that sandwich a central fabric layer of propylene-α-olefin elastomer.

Yet another exemplary embodiment of an ISL includes three different fabric layers: one facing layer made from a blend of a propylene-α-olefin elastomer and a polypropylene, another facing layer formed from polyethylene terephthalate, and a core fabric layer formed from a propylene-α-olefin elastomer.

And yet another exemplary embodiment of an ISL includes facing fabric layers made from bicomponent fibers of an ethylene-α-olefin block copolymer sandwiching a polypropylene and a core fabric layer of propylene-α-olefin elastomer.

Any layer of the ISLs or any layer of secondary fabric and/or film of a composite may include other additives. The additives may be present at any desirable level, examples of which include from 0.1 to 3 or 4 or 5 or 10 wt %, by weight of the fiber or fabric or film. As used herein, "additives" include, for example, stabilizers, surfactants, antioxidants, anti-ozonants (e.g., thioureas), fillers, migrating (preventative) agent, colorants, nucleating agents, anti-block agents, UV-blockers/absorbers, hydrocarbon resins (e.g., Oppera™ resins, Picolyte™ tackifiers, polyisobutylenes, etc.) and other tackifiers, oils (e.g., paraffinic, mineral, aromatic, synthetic), slip additives, hydrophilic additives (e.g., Irgasurfr™560 HL), hydrophobic additives (e.g., wax) and combinations thereof. Primary and secondary antioxidants include, for example, hindered phenols, hindered amines, and phosphates. Slip agents include, for example, oleamide and erucamide. Examples of fillers include carbon black, clay, talc, calcium carbonate, mica, silica, silicate, and combinations thereof. Other additives include dispersing agents and catalyst deactivators such as calcium stearate, hydrotalcite, and calcium oxide, and/or other acid neutralizers known in the art. The additives may be added to the materials that make up the various layers of the ISL and/or composite by any means such as by dry blending the additive with pellets of the pure polymer material prior to meltspinning, or by obtaining the fabric material already possessing the additive(s).

Regardless of the materials used to make up the ISL, each layer may have similar or different properties. For instance, in certain embodiments any one or more of the layers has a basis weight within the range from 5 or 10 or 20 or 30 to 40 or 50 or 60 or 70 or 80 or 100 or 150 or 200 g/m$^2$. Also, in certain embodiments the average diameter of the fibers making up the fabrics is less than 0.1 or 1.0 or 2.0 to 15 or 20 or 30 or 40 or 50 or 80 or 100 or 120 μm, or is within the range of from 0.1 or 5 or 10 or 15 to 30 or 40 or 50 or 80 or 100 or 120 μm. In yet other embodiments the number density of fibers per unit area in adjacent fabrics is within the range from 20 or 30 to 200 or 250 or 200 or 300 or 350.

As an example, an ISL having fabric layers whose fibers possess a constant denier (or fiber average diameter) but varying basis weights can be produced. Assume that a die is used as shown in FIG. 2 that is 1 meter wide and the target basis weight of the fabric is 80 g/m$^2$ made from an elastomer such as a propylene-α-olefin elastomer. Therefore, each row of nozzles extruding elastomer will have an output of 8 grams of polymer per minute (i.e., 10 rows at 8 g/row=80 g). Assume the outer rows of nozzles have a throughput twice that of the inner nozzles so the outer zone nozzles will be producing 16 g/row. The final ISL would consist of a 32 g/m$^2$ facing layer fabric, 80 g/m$^2$ of an elastic fabric and another 32 g/m$^2$ facing layer fabric for a total fabric basis weight of 144 g/m$^2$. The facing layers of this structure will contain twice the length of fiber that the equivalent mass of core fabric would contain.

As another example, an ISL having fabrics whose fibers possess different denier (or fiber average diameter) can be produced. A facing layer having 30% finer denier fibers would produce twice the length of fiber compared to a core fiber. Therefore, using the above example with a facing layer comprised of 30% fiber denier fibers, the total amount of additional length of fiber per unit area in the facing layer would be 4 times that of the core. This has the potential for allowing greater extensibility of the fabric with limited constraint as well as a loftier fabric that can be perceived as softer.

In one specific embodiment, the facing layers have a basis weight within the range from 0.1 or 1 or 5 or 10 to 20 or 30 or 40 or 50 g/m$^2$, wherein the basis weight of the facing layers is at least 5 or 10 or 20 or 30 or 40% less than the basis weight of the elastic layer.

In another specific embodiment, the facing layers have a basis weight within the range from 0.1 or 1 or 5 or 10 to 20 or 30 or 40 or 50 g/m$^2$, wherein the basis weight of each facing layer differs by at least 5 or 10 or 20 or 30 or 40%.

In yet another specific embodiment, the average diameter of the fibers that make up the elastic fabric is within the range of from 0.1 or 1.0 or 2.0 to 15 or 20 or 30 or 40 or 50 or 80 or 100 or 120 μm, wherein the average diameter of the facing layer fibers is at least 5 or 10 or 20 or 30 or 40% less than the average diameter of the elastic layer fibers.

And in yet another specific embodiment, the average diameter of the fibers that make up a first facing layer is within the range of from 0.1 or 1.0 or 2.0 to 15 or 20 or 30 or 40 or 50 or 80 or 100 or 120 μm, wherein the average diameter of the other one or more facing layer fibers is at least 5 or 10 or 20 or 30 or 40% less than the average diameter of the first facing layer.

In any case, the ISLs described herein can take on any desirable structure. In certain embodiments the ISLs comprise structures selected from AB, AC, ABA, ABC, ACA, AAB, ABB, B'BB', B'$_B$BB'$_B$, CCA, CAA, AABAA, CCBCC, ABBAB, A'B, A'C, A'BA, A'BC, A'CA, AB', AC', AB'A, AB'C, AC'A, A$_B$B, A$_B$C, A$_B$BA, A$_B$BC, A$_B$CA, AB$_B$, AC$_B$, AB$_B$A, AB$_B$C, AC$_B$A, AAB, ACC, AABAA, AABCC, AACAA, AA'B, AA'C, A'BAA, A'BCC, A'CAA, ABB', ACC', ABB'A, ABB'C, AA'C'A'A, AA$_B$B, A$_B$CA, A$_B$BA, A$_B$BBC, A$_B$CCA, AB$_B$, AA'C$_B$, ABB$_B$C, AB$_B$CA', AC$_B$AC$_B$, and variants thereof, wherein "A" is a fabric comprising a first thermoplastic, or extensible material, "B" is a fabric comprising a first elastomer, "C" is a fabric comprising a second thermoplastic that is different than the first thermoplastic and is extensible, "A'" is a fabric comprising the first thermoplastic having a distinct physical property (e.g., bicomponent, different diameter of fibers, basis weight, etc.) from "A", "B'" is a fabric comprising the first elastomer having a distinct physical property from "B", "C'" is a fabric comprising the second thermoplastic having a distinct physical property from "C", and the subscript "B" refers to fabrics that comprise a blend of thermoplastics, elastomers, or both.

Bicomponent Fibers and Different Shapes

In certain embodiments, the fibers used to form any one or all of the ISL layers are bicomponent or "conjugate" fibers. These include structures that are side-by-side, segmented, sheath/core, island-in-the-sea structures ("matrix fibril"), and others as is known in the art. Thus, a bicomponent fiber is one that has a cross-sectional morphology that is at least bi-phasic in varying geometries. In certain embodiments, at least one of the polymers used to make the fiber is a propylene-α-olefin elastomer. The second, third, etc. component of the conjugate fiber may be made from any suitable materials such as polypropylene, polyethylene (e.g., LDPE, LLDPE, HDPE), plastomers (e.g., ethylene-α-olefin copolymers), polyurethane, polyesters such as polyethylene terephthanlate, polylactic acid, polyvinyl chloride, polytetrafluoroethylene, styrenic block copolymers, propylene-α-olefin elastomers (e.g., Vistamaxx), ethylene-α-olefin elastomers (e.g., Infuse™ elastomers), ethylene vinyl acetate copolymers, polyamide, polycarbonate, cellulosics (e.g., cotton, Rayon™, Lyocell™, Tencil™), wood, viscose, and blends of any two or more of these materials. A particularly preferred second (or third, etc.) component is a polyethylene. The main objective of producing bicomponent fibers is to exploit capabilities not existing in either polymer alone. By this technique, it is possible to produce fibers of any cross sectional shape or geometry that can be imagined. Side-by-side fibers are generally used as self-crimping fibers. There are several systems used to obtain a self-crimping fiber. One of them is based on different shrinkage characteristics of each component. There have been attempts to produce self-crimping fibers based on different electrometric properties of the components. Some types of side-by-side fibers crimp spontaneously as the drawing tension is removed and others have "latent crimp", appearing when certain ambient conditions are obtained. In some embodiments "reversible" and "non-reversible" crimps are used, when reversible crimp can be eliminated as the fiber is immersed in water and reappears when the fiber is dried. This phenomenon is based on swelling characteristics of the components. Different melting points on the sides of the fiber are taken advantage of when fibers are used as bonding fibers in thermally bonded non-woven webs.

Sheath-core bicomponent fibers are those fibers where one of the components (core) is fully surrounded by the second component (sheath). In certain embodiments, the fibers of one or more of the layers of the ISL are bicomponent. Adhesion is not always essential for fiber integrity. The most common way of production of sheath-core fibers is a technique where two polymer liquids are separately led to a position very close to the spinneret orifices and then extruded in sheath-core form. In the case of concentric fibers, the orifice supplying the "core" polymer is in the center of the spinning orifice outlet and flow conditions of core polymer fluid are strictly controlled to maintain the concentricity of both components when spinning Eccentric fiber production is based on several approaches: eccentric positioning of the inner polymer channel and controlling of the supply rates of the two component polymers; introducing a varying element near the supply of the sheath component melt; introducing a stream of single component merging with concentric sheath-core component just before emerging from the orifice; and deformation of spun concentric fiber by passing it over a hot edge. Matrix fibril fibers are spun from the mixture of two polymers in the required proportion; where one polymer is suspended in droplet form in the second melt. A feature in production of matrix-fibril fibers is the desirability of artificial cooling of the fiber immediately below the spinneret orifices. Different spinnability of the two components would almost disable the spinnability of the mixture, except for low concentration mixtures (less than 20%). Bicomponent fibers are used to make fabrics that go into such products as diapers, feminine care, and adult incontinence products as top sheet, back sheet, leg cuffs, elastic waistband, transfer layers; air-laid nonwoven structures are used as absorbent cores in wet wipes; and used in spun laced nonwoven products like medical disposable textiles, and filtration products.

Also in certain embodiments any one or all of the ISL layers may be a mixed-fiber fabric comprising propylene-based fibers. Mixed-fiber fabrics are disclosed in, for example, US 2008/0038982, incorporated herein by reference. There can be one, two or more other types of fibers with the propylene-based fibers include fibers made from polypropylene, polyethylene, plastomers, polyurethane, polyesters such as polyethylene terephthalate, polylactic acid, polyvinyl chloride, polytetrafluoroethylene, styrenic block copolymers, propylene-α-olefin elastomers (e.g., Vistamaxx™) or other elastomers as described herein, ethylene vinyl acetate copolymers, polyamide, polycarbonate, cellulosics (e.g., cotton, Rayon™, Lyocell™, Tencil™), wood, viscose, and blends of any two or more of these materials.

Post-Treatment

Various additional potential processing and/or finishing steps known in the art, such as slitting, treating, printing graphics, etc., may be performed without departing from the spirit and scope of the invention. For instance, the ISL, with or without secondary layers as described below, may optionally be mechanically stretched in the cross-machine direction ("CD") and/or machine directions ("MD") to enhance loft, feel and extensibility. In one embodiment, the ISL may be coursed through two or more rolls that have grooves in the CD and/or MD directions. Such grooved satellite/anvil roll arrangements are described in US 2004/0110442 and US 2006/0151914 and U.S. Pat. No. 5,914,084, incorporated herein by reference. The grooved rolls may be constructed of steel or other hard material (such as a hard rubber). If desired, heat may be applied by any suitable method known in the art, such as heated air, infrared heaters, heated nipped rolls, or partial wrapping of the ISL around one or more heated rolls or steam canisters, etc. Heat may also be applied to the grooved rolls themselves. It should also be understood that other grooved roll arrangement are equally suitable, such as two grooved rolls positioned immediately adjacent to one another. Besides grooved rolls, other techniques may also be used to mechanically stretch the composite in one or more directions. For example, self centering intermeshing discs are described in U.S. Pat. No. 4,223,059, U.S. Pat. No. 4,285,100 and U.S. Pat. No. 4,368,565, incorporated herein by reference, that can mechanically stretch a nonwoven web in MD and/or CD. In another example, the composite may be passed through a tenter frame that stretches the composite. Such tenter frames are well known in the art and described, for instance, in US 2004/0121687, incorporated herein by reference.

In certain embodiments, the ISL may form a composite either with itself or with other secondary layers. The joining or bonding of the various layers of a multi-layer structure such as the ISL and/or composite comprising the ISL can be done such that CD and/or MD orientation is imparted into the ISL and/or composite, especially in the case where the ISL includes at least one elastomeric layer. Many approaches may be taken to form a multi-layered structure comprising an elastomeric film and/or fabric layer which remains elastomeric once the layers are bonded together. One approach is to fold, corrugate, crepe, or otherwise gather the fabric layer prior to bonding it to the elastomeric film. The gathered fabric is bonded to the film at specified points or lines, not continually across the surface of the film. While the film/fabric is in a relaxed state, the fabric remains corrugated or puckered on the film; once the elastomeric film is stretched, the fabric layer flattens out until the puckered material is essentially flat, at which point the elastomer stretching ceases.

Another approach to impart CD and/or MD stretch is to stretch the elastomeric film/fabric, then bond the fabric to the film while the film is stretched. Again, the fabric is bonded to the film at specified points or lines rather than continually across the surface of the film. When the stretched film is allowed to relax, the fabric corrugates or puckers over the unstretched elastomeric film.

Yet another approach is to "neck" the fabric prior to bonding it to the elastomer layer as described in U.S. Pat. No. 5,336,545, U.S. Pat. No. 5,226,992, U.S. Pat. No. 4,981,747 and U.S. Pat. No. 4,965,122, incorporated herein by reference. Necking is a process by which the fabric is pulled in one direction, which causes the fibers in the fabric to slide closer together, and the width of the fabric in the direction perpendicular to the pulling direction is reduced. If the necked fabric is point-bonded to an elastomeric layer, the resulting layered structure will stretch somewhat in a direction perpendicular to the direction in which the fabric was pulled during the necking process, because the fibers of the necked fabric can slide away from one another as the layered structure stretches.

Yet another approach is to activate the elastomeric multi-layered structure once it has been formed. Activation is a process by which the elastomeric layered structure is rendered easy to stretch. Most often, activation is a physical treatment, modification or deformation of the elastomeric layered structure, said activation being performed by mechanical means. For example, the elastomeric layered structure may be incrementally stretched by using intermeshing rollers, as discussed in U.S. Pat. No. 5,422,172, or US 2007/0197117, incorporated herein by reference, to render the layered structure stretchable and recoverable. Finally, the elastomeric film or fabric may be such that it needs no activation and is simply formed onto and/or bound to a secondary layer to form an elastic layered structure. Such processes can also be used on non-elastomeric layered structures to improve other properties such as drape and softness.

In certain embodiments, the facing layers are intrinsically non-elastic such that when incorporated in the ISL, the facing layers are non-constraining and extensible without any mechanical stretching. Such is the case, for example when an elastic fabric layer made from propylene-α-olefin elastomers is sandwiched between two layers of an extensible polypropylene or polypropylene/PET spunlace fabric.

Secondary Layers—Composite

In any case, the ISLs described herein may combined with and/or bound to one or more secondary layers to form a "composite", the secondary layers comprising other fabrics, nets, coform fabrics, scrims, and/or films, any of which are prepared from natural materials, synthetic materials, or blends thereof. The materials may be extensible, elastic or plastic in certain embodiments. The secondary layers may be combined with the ISLs by any means known in the art such by contacting under heat, air pressure or water pressure to entangle and/or join the fabric (or film) layers to at least one face of the ISL.

In particular embodiments, the one or more secondary layers comprise materials selected from the group consisting of polypropylene (e.g., homopolymers, impact copolymers, copolymers), polyethylene (e.g., LDPE, LLDPE, HDPE), plastomers (ethylene-α-olefin copolymers and block copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics (e.g., cotton, Rayon™, Lyocell™, Tencil™), wood, viscose, an elastomer, and blends of any two or more of these materials.

The secondary layer(s) may be in the form of films, fabrics, or both. Films may be cast, blown, or made by any other suitable means. When the secondary layers are fabrics, the secondary layers can be meltspun, carded, dry-laid, or wet-laid fabrics, any of which may be spunlaced. The dry-laid processes include mechanical means, such as how carded fabrics are produced, and aerodynamic means, such as, air-laid methods. Dry-laid nonwovens are made with staple fiber processing machinery such as cards and garnetts, which are designed to manipulate staple fibers in the dry state. Also included in this category are nonwovens made from fibers in the form of tow, and fabrics composed of staple fibers and stitching filaments or yarns, namely, stitchbonded nonwovens. Fabrics made by wet-laid processes made with machinery associated with pulp fiberizing, such as hammer mills, and paperforming. Web-bonding processes can be described as being chemical processes or physical processes. In any case, dry- and wet-laid fabrics can be jet and/or hydroentangled to form a spunlace fabric as is known in the art. Chemical bonding refers to the use of water-based and solvent-based polymers to bind together the fibrous webs. These binders can be applied by saturation (impregnation), spraying, printing, or application as a foam. Physical bonding processes include thermal processes such as calendering and hot air bonding, and mechanical processes such as needling and hydroentangling. Meltspun nonwovens are made in one continuous process: fibers are spun by melt extrusion and then directly dispersed into a web by deflectors or can be directed with air streams.

More particularly, "carding" is the process of disentangling, cleaning, and intermixing fibers to make a web for further processing into a nonwoven fabric and is well known in the art. The fabric is called a "carded" fabric when made using this process. The aim is to take a mass of fiber tufts and produce a uniform, clean web. An example of a method of carding is described in U.S. Pat. No. 4,105,381, incorporated herein by reference. The process predominantly aligns the fibers which are held together as a web by mechanical entanglement and fiber-fiber friction. The main type of card is a roller card. The carding action is the combing or working of fibers between the points of saw-tooth wire clothing on a series of interworking card rollers. Short fibers and foreign bodies are removed, the fiber tufts are opened, and the fibers are arranged more or less parallel. The carding or parallelization of fibers occurs when one of the surfaces moves at a speed greater than the other. Fibers are removed, or "stripped," when the points are arranged in the same direction and the more quickly moving surface removes or transfers the fibers from the more slowly moving surface.

High speed cards designed to produce nonwoven webs may be configured with one or more main cylinders, roller or stationary tops, one or two doffers, or various combinations of these principal components. Single-cylinder cards are usually used for products requiring machine-direction or parallel-fiber orientation. Double-cylinder cards (or "tandem" cards) are basically two single-cylinder cards linked together by a section of stripper and feed rolls to transport and feed the web from the first working area to the second. The coupling of two carding units in tandem distributes the working area and permits greater fiber throughput at web quality levels comparable to slower single-cylinder machines. Roller-top cards have five to seven sets of workers and strippers to mix and card the fibers carried on the cylinder. The multiple transferring action and re-introduction of new groupings of fibers to the carding zones provides a doubling effect which enhances web uniformity. Stationary-top cards have strips of metallic clothing mounted on plates positioned concavely around the upper periphery of the cylinder. The additional carding surfaces thus established provide expanded fiber alignment with minimum fiber extraction.

In certain embodiments, the ISLs and/or composites may comprise one or more coform fabric layers. Methods for forming such fabrics are described in, for example, U.S. Pat. No. 4,818,464 and U.S. Pat. No. 5,720,832, incorporated herein by reference. Generally, fabrics of two or more different thermoplastic and/or elastomeric materials may be formed. For example, the coform fabrics described herein may comprise from 1 or 5 or 10 or 20 or 40 or 50 to 60 or 70 or 80 or 90 or 99 wt % of the a thermoplastic like polypropylene or an elastomer such as a propylene-α-olefin and from 99 or 90 or 80 or 70 or 60 to 50 or 40 or 20 or 10 or 5 or 1 wt % of another thermoplastic material such as another polypropylene, polyethylene, polyurethane, etc., or an elastomer such as a propylene-α-olefin elastomer or a styrenic block copolymer. Thus, in one aspect is provided the introduction of molten extruded primary material (e.g., polypropylene or an elastomer) and optionally one or more other materials (elastomeric, absorbent, thermoplastic, etc.) to the shear layers of at least one rapidly moving stream or jet of an inert gas from two or more extrusion openings or sets of openings placed surrounding or on alternate or opposite sides of the high velocity gas delivery nozzle. The material which is extruded from these openings may be the same material or, alternatively, materials which differ from one another in their chemical and/or physical properties. Designated as first, second, etc., thermoplastic, absorbent or elastomeric material, the materials may be of the same or different chemical composition or molecular structure and, when of the same molecular structure, may differ in molecular weight or other characteristics which results in differing physical properties. In those situations in which thermoplastic materials are used which differ from one another in some respect, such as in physical properties, the extrusion or die head will be provided with multiple chambers, one for each of the thermoplastic materials, such as first, second, etc., thermoplastic materials. That is, the die head is provided with a first chamber for the first thermoplastic material and a second chamber for the second thermoplastic material, etc. In contrast, such an arrangement where a single chamber is provided with conduits or passages which provide communication between the single chamber and each of the first and the second thermoplastic extrusion outlet openings, when a first chamber and a second chamber are employed for first and second thermoplastic materials, respectively, each chamber is provided with passages to only one extrusion outlet opening or set of openings. Thus, the first thermoplastic material chamber communicates with the first extrusion outlet opening by means of the first thermoplastic material passage, while the second thermoplastic material chamber communicates with the second thermoplastic extrusion opening through the second thermoplastic material passage.

The two or more various layers of fabrics and/or films that make up the composites described herein may be bound in some manner. As used herein, "bound" (or "bond" or "adhered") means that two or more fabrics, or a plurality of fibers, is secured to one another through 1) the inherent tendency of the molten or non-molten materials' ability to adhere through chemical interactions and/or 2) the ability of the molten or non-molten fibers and/or fabric to entangle with the fibers comprising another material to generate a linkage between the fibers or fabrics. The layers of the composites described herein may be bonded to one another by known methods including heat bonding methods such as hot embossing, spot bonding, calendering, and ultrasonic bonding; mechanical entangling methods such as needle punching and hydroentanglement; use of adhesives such as hot melt adhesives and urethane adhesives; and extrusion lamination. Adhesives may be used to facilitate bonding of fabric and/or film layers, but in a particular embodiment, adhesives are absent from the fabric and/or film layers (not used to bond the fibers of a fabric) described herein; and in another embodiment, absent from the ISLs (not used to bond adjacent fabric layers) described herein. Examples of adhesives include those comprising low weight average molecular weight (<80,000 g/mole) polyolefins, polyvinyl acetate polyamide, hydrocarbon resins, natural asphalts, styrenic rubbers, polyisoprene and blends thereof.

The composites that can be produced incorporating the ISLs are not limited as any number or type of fabric or film can be combined with the ISLs to achieve various results. In certain embodiments, the composites are further characterized in that the meltspun ISL, designation "P", is combined with one or more secondary layers of fabric or film to form a composite, the composite is selected from structures consisting of MP, MPM, PP, PPP, PPPP, PPM, PMP, PMMP, PPMPP, PMMPP, PMPPP, PPMMPP, PMPMP, PPPMPP, SP, SPS, SPPS, SPPPS, SSPS, SSPPS, SSPPPS, PP, PPP, PPPP, DPPPP, MPPPP, SPPPP, PPS, PSP, PSSP, PPSPP, PSSPP, PSPPP, PPSSPP, PSPSP, PPPSPP, DP, DDP, DPD, DPP, DDDDP, PPD, PDP, PDDP, PPDPP, PDDPP, PPDDPP, DMP, DDMPP, PDMDP, DPMPD, DDPMPD, DDPMPDD, DDPMMPDD, DPMMPD, PDMDMD, PMDMP, PDM-MDD, PPDMDPP, DDDDMP, PPDMMDPP, FP, MPF, FPP, FPPP, FPPPP, FPPF, FPFPF, FPPM, PFP, PMFP, PPFPP, PFFPP, PMFPP, PPMFPP, PFD, PDFD, PDDFFD, PDFDD, DPF, DFP, DDDFP, FDP, PDDF, PFDPP, FPDDPP, PFDDPP, DMPF, DFMPP, PDFDP, DPFPD, DDPFPD, DDPFPDD, DDPFFPDD, DPFFPD, PFDFD, PFDFP, SFMP, SSFMP, PFFP, TP, TPT, PTP, WP, WPW, PWF, PA, PAP, APA, TPPT, PTTP, PAT, PAW, TTPTT, TTWPWTT, TTFPFTT, FTPTF and PWP, wherein "M" represents meltblown fabric layers, "S" represents spunbond fabric layers, "F" represents film layers, "D" represents dry-laid (carded or air-laid) fabric layers, "T" represents textile-type of fabrics, "W" represents woven fabrics, and "A" represents absorbent (pulp, paper, SAP etc.) fabrics, each letter representing a layer that is adjacent to the other letters.

Articles

The ISLs and/or composites described herein may be used to form any type of end use article or in any desirable end use application. Such applications include an absorbent or barrier product such as, but not limited to, personal care products, baby diapers, training pants, absorbent underpads, swim wear, wipes, feminine hygiene products, bandages, wound care products, medical garments, surgical gowns, filters, adult incontinence products, surgical drapes, coverings, garments, and cleaning articles and apparatus.

In one embodiment the absorbent article is a disposable diaper as disclosed in, for example, US 2008/0119102, incorporated herein by reference, which generally defines a front waist section, a rear waist section, and an intermediate section that interconnects the front and rear waist sections. The front and rear waist sections include the general portions of the diaper which are constructed to extend substantially over the wearer's front and rear abdominal regions, respectively, during use. The intermediate section of the diaper includes the general portion of the diaper that is constructed to extend through the wearer's crotch region between the legs. Thus, the intermediate section is an area where repeated liquid surges typically occur in the diaper. Any one or more of these structures, for example, may comprise the ISLs or composites described herein.

The diaper includes, without limitation, an outer cover, or backsheet, a liquid permeable bodyside liner, or topsheet, positioned in facing relation with the backsheet, and an absorbent core body, or liquid retention structure, such as an absorbent pad, which is located between the backsheet and the topsheet. Any one or more of these structures, for example, may comprise the ISLs or composites described herein. The backsheet defines a length, or longitudinal direction, and a width or lateral direction, which coincide with the length and width of the diaper. The liquid retention structure generally has a length and width that are less than the length and width of the backsheet, respectively. Thus, marginal portions of the diaper, such as marginal sections of the backsheet may extend past the terminal edges of the liquid retention structure. In certain embodiments, the backsheet extends outwardly beyond the terminal marginal edges of the liquid retention structure to form side margins and end margins of the diaper. The topsheet is generally coextensive with the backsheet but may optionally cover an area that is larger or smaller than the area of the backsheet, as desired.

To provide an improved fit and to help reduce leakage of body exudates from the diaper, the diaper side margins and end margins may be elasticized with suitable elastic members. For example, the diaper may include leg elastics constructed to operably tension the side margins of the diaper to provide elasticized leg bands which can closely fit around the legs of the wearer to reduce leakage and provide improved comfort and appearance. Waist elastics are employed to elasticize the end margins of the diaper to provide elasticized waistbands. The waist elastics are configured to provide a resilient, comfortably close fit around the waist of the wearer. The latently elastic materials, such as propylene-α-olefin elastomers which may form an ISL or composite as described herein are suitable for use as the leg elastics and waist elastics. Exemplary of such materials are sheets that either comprise or are adhered to the backsheet, such that elastic constrictive forces are imparted to the backsheet.

As is known, fastening means, such as hook and loop fasteners, may be employed to secure the diaper on a wearer. Alternatively, other fastening means, such as buttons, pins, snaps, adhesive tape fasteners, cohesives, fabric-and-loop fasteners, or the like, may be employed. In the illustrated embodiment, the diaper includes a pair of side panels (wings or ears) to which the fasteners, indicated as the hook portion of a hook and loop fastener, are attached. Generally, the side panels are attached to the side edges of the diaper in one of the waist sections and extend laterally outward therefrom. The side panels may be elasticized or otherwise rendered elastomeric by use of latently elastic materials.

The diaper may also include a surge management layer located between the topsheet and the liquid retention structure to rapidly accept fluid exudates and distribute the fluid exudates to the liquid retention structure within the diaper. The diaper may further include a ventilation layer, also called a spacer, or spacer layer, located between the liquid retention structure and the backsheet to insulate the backsheet from the liquid retention structure to reduce the dampness of the garment at the exterior surface of a breathable outer cover, or backsheet. Any one of these structures may comprise the ISLs and constructions described herein.

The disposable diaper may also include a pair of containment flaps which are configured to provide a barrier to the lateral flow of body exudates. The containment flaps may be located along the laterally opposed side edges of the diaper adjacent to the side edges of the liquid retention structure. Each containment flap typically defines an unattached edge that is configured to maintain an upright, perpendicular configuration in at least the intermediate section of the diaper to form a seal against the wearer's body. The containment flaps may extend longitudinally along the entire length of the liquid retention structure or may only extend partially along the length of the liquid retention structure. When the containment flaps are shorter in length than the liquid retention structure, the containment flaps can be selectively positioned anywhere along the side edges of the diaper in the intermediate section. Such containment flaps are generally well known to those skilled in the art.

Having described the various features of the ISLs and composites comprising the ISLs, described in a first numbered embodiment is:

1. A meltspun in situ laminate ("ISL") comprising two or more layers of meltspun fabrics, wherein layers that are adjacent to one another are in situ entangled with one another to define an interfacial region of mixed fibers between the layers.

2. The in situ laminate of numbered embodiment 1, wherein adhesives are absent between the layers.

3. The in situ laminate of numbered embodiments 1 and 2, wherein the in situ laminate is not subjected to air- or hydro-entanglement processes.

4. The in situ laminate of any one of the previously numbered embodiments, wherein adjacent layers have a Peel Strength of greater than 10 grams.

5. The in situ laminate of any one of the previously numbered embodiments, wherein (a) the basis weight of the fabrics is not the same, (b) the average diameter of the fibers making up the fabrics is not the same, (c) the composition of the fabrics is not the same, (d) number density of fibers per unit area in adjacent fabrics is not the same, (e) the cross-sectional shape of the fibers is not the same or (f) the cross-sectional morphology of the fibers (e.g., bicomponent fibers) of the fabrics are not the same, (g) or any combination of two or more of these descriptors.

6. The in situ laminate of any one of the previously numbered embodiments, wherein at least one fabric layer is elastic.

7. The in situ laminate of any one of the previously numbered embodiments, wherein the two or more layers of meltspun fabrics are formed simultaneously or nearly simultaneously.

8. The in situ laminate of any one of the previously numbered embodiments, wherein the two or more layers are meltblown.

9. The in situ laminate of any one of the previously numbered embodiments, comprising structures selected from AB, AC, ABA, ABC, ACA, AAB, ABB, B'BB', B'$_B$BB'$_B$, CCA, CAA, AABAA, CCBCC, ABBAB, A'B, A'C, A'BA, A'BC, A'CA, AB', AC', AB'A, AB'C, AC'A, A$_B$B, A$_B$C, A$_B$BA, A$_B$BC, A$_B$CA, AB$_B$, AC$_B$, AB$_B$A, AB$_B$C, AC$_B$A, AAB, ACC, AABAA, AABCC, AACAA, AA'B, AA'C, A'BAA, A'BCC, A'CAA, ABB', ACC', ABB'A, ABB'C, AA'C'A'A, AA$_B$B, A$_B$CA, A$_B$BA, A$_B$BBC, A$_B$CCA, AB$_B$, AA'C$_B$, ABB$_B$C, AB$_B$CA', AC$_B$AC$_B$, and variants thereof, wherein "A" is a fabric comprising a first thermoplastic, "B" is a fabric comprising a first elastomer, "C" is a fabric comprising a second thermoplastic that is different than the first thermoplastic, "A'" is a fabric comprising the first thermoplastic having a distinct physical property from "A", "B'" is a fabric comprising the first elastomer having a distinct physical property from "B", "C'" is a fabric comprising the second thermoplastic having a distinct physical property from "C", and the subscript "B" refers to fabrics that comprise a blend of thermoplastics, elastomers, or both.

10. The in situ laminate of numbered embodiment 6, wherein the elastic fabric comprises an elastomer selected from the group consisting of propylene-α-olefin elastomer, natural rubber, synthetic polyisoprene, butyl rubber, halogenated butyl rubbers, polybutadiene, styrene-butadiene rubber, styrenic block copolymers, nitrile rubber, hydrogenated nitrile rubbers, chloroprene rubber, polychloroprene, neoprene, ethylene-propylene rubber and ethylene-propylene-diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, ethylene-α-olefin random and block copolymers, thermoplastic elastomers, thermoplastic vulcanizates, thermoplastic polyurethane, thermoplastic olefins, polysulfide rubber, or blends of any two or more of these elastomers.

11. The in situ laminate of numbered embodiment 6, wherein the elastic fabric comprises a propylene-α-olefin elastomer having a MFR of less than 20 or 24 or 40 or 60 or 80 dg/min, a H$_f$ of less than 80 J/g, and comonomer-derived content within the range from 5 to 30 wt %, by weight of the propylene-α-olefin elastomer.

12. The in situ laminate of any one of the previously numbered embodiments, wherein the two or more layers of the meltspun fabrics comprise at least two facing layers and an elastic layer, the elastic fabric layer located between the two facing layers.

13. The in situ laminate of numbered embodiment 12, wherein the facing fabric layers comprise a material selected from the group consisting of polypropylene, polyethylene, functionalized polyolefins, plastomers (ethylene-α-olefin copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics, an elastomer, poly(acetylene), poly(thiophene), poly(aniline), poly(fluorene), poly(pyrrole), poly(3-alkythiophene), poly(phenylene sulphide), polynaphthalenes, poly(phenylene vinylene) and poly(vinylidene fluoride), and blends of any two or more of these materials.

14. The in situ laminate of numbered embodiment 12, wherein the facing layers are intrinsically non-elastic such that when incorporated in the in situ laminate, the facing layers are non-constraining and extensible without any prior mechanical stretching.

15. The in situ laminate of any one of the previously numbered embodiments, wherein the elastic fabric layer has a basis weight within the range from 5 or 10 or 20 or 30 to 40 or 50 or 60 or 70 or 80 or 100 or 150 or 200 g/m$^2$.

16. The in situ laminate of numbered embodiment 12, wherein the facing layers have a basis weight within the range from 0.1 or 1 or 5 or 10 to 20 or 30 or 40 or 50 g/m$^2$, wherein the basis weight of the facing layers is at least 5 or 10 or 20 or 30 or 40% less than the basis weight of the elastic layer.

17. The in situ laminate of numbered embodiment 12, wherein the facing layers have a basis weight within the range from 0.1 or 1 or 5 or 10 to 20 or 30 or 40 or 50 g/m$^2$, wherein the basis weight of each facing layer differs by at least 5 or 10 or 20 or 30 or 40%.

18. The in situ laminate of numbered embodiment 12, wherein the average diameter of the fibers that make up the elastic fabric is within the range of from 0.1 or 1.0 or 2.0 to 15 or 20 or 30 or 40 or 50 or 80 or 100 or 120 μm.

19. The in situ laminate of numbered embodiment 12, wherein the average diameter of the fibers that make up the elastic fabric is within the range of from 0.1 or 1.0 or 2.0 to 15 or 20 or 30 or 40 or 50 or 80 or 100 or 120 μm, wherein the average diameter of the facing layer fibers is at least 5 or 10 or 20 or 30 or 40% less than the average diameter of the elastic layer.

20. A composite comprising at least one in situ laminate of any one of the preceding embodiments, wherein the composite comprises one or more secondary layers selected from coform fabrics, carded fabrics, wet-laid fabrics, dry-laid fabrics, meltspun fabrics, nets, scrims, textile fabrics, woven fabrics, and films.

21. The composite of numbered embodiment 20, wherein the one or more secondary layers comprise materials selected from the group consisting of polypropylene, propylene-α-olefin copolymers, polyethylene, plastomers, polyurethane, polyesters such as polyethylene terephthalate, polylactic acid, polyvinyl chloride, polytetrafluoroethylene, styrenic block copolymers, ethylene-α-olefin copolymers and block copolymers, ethylene vinyl acetate copolymers, polyamide, polycarbonate, cellulosics, wood, viscose, cotton, an elastomer, and blends of any two or more of these materials.

22. The composite of numbered embodiment 20, further characterized in that the meltspun in situ laminate, designated "P", is combined with one or more secondary layers of fabric or film to form a composite, the composite is selected from structures consisting of MP, MPM, PP, PPP, PPPP, PPM, PMP, PMMP, PPMPP, PMMPP, PMPPP, PPMMPP, PMPMP, PPPMPP, SP, SPS, SPPS, SPPPS, SSPS, SSPPS, SSPPPS, PP, PPP, PPPP, DPPPP, MPPPP, SPPPP, PPS, PSP, PSSP, PPSPP, PSSPP, PSPPP, PPSSPP, PSPSP, PPPSPP, DP, DDP, DPD, DPP, DDDDP, PPD, PDP, PDDP, PPDPP, PDDPP, PPDDPP, DMP, DDMPP, PDMDP, DPMPD, DDPMPD, DDPMPDD, DDPMMPDD, DPMMPD, PDMDMD, PMDMP, PDMMDD, PPDMDPP, DDDDMP, PPDMMDPP, FP, MPF, FPP, FPPP, FPPPP, FPPF, FPFPF, FPPM, PFP, PMFP, PPFPP, PFFPP, PMFPP, PPMFPP, PFD, PDFD, PDDFFD, PDFDD, DPF, DFP, DDDFP, FDP, PDDF, PFDPP, FPDDPP, PFDDPP, DMPF, DFMPP, PDFDP, DPFPD, DDPFPD, DDPFPDD, DDPFFPDD, DPFFPD, PFDFD, PFDFP, SFMP, SSFMP, PFFP, TP, TPT, PTP, WP, WPW, PWP, PA, PAP, APA, TPPT, PTTP, PAT, PAW, PWP, wherein "M" represents meltblown fabric layers, "S" represents spunbond fabric layers, "F" represents film layers, "D" represents dry-laid (carded or air-laid; spunlaced) fabric layers, "T" represents textile-type of fabrics, "W" represents woven fabrics, and "A" represents absorbent (pulp, paper, SAP etc.) fabrics.

23. An absorbent or barrier product comprising the in situ laminate or composite of any one of the previously numbered embodiments, the articles comprising personal care products, baby diapers, training pants, absorbent underpads, swim wear, wipes, feminine hygiene products, bandages, wound care products, medical garments, surgical gowns, filters, adult incontinence products, surgical drapes, coverings, garments, protective apparel, clothing apparel, and cleaning articles and apparatus.

24. A method of making a meltspun in situ laminate of any one of the previously numbered embodiments comprising simultaneously meltspinning two or more polymer melts adjacent to one another to form adjacent fabrics, wherein layers that are adjacent to one another are in situ entangled with one another to form an interfacial region of mixed fibers between the layers.

25. The method of numbered embodiment 24, wherein the throughput of at least two adjacent polymer melts are equivalent or differs by a factor of greater than 1.5 or 2 or 2.5 or 3 or 3.5 or 4.

26. The method of numbered embodiments 24 to 25, wherein adhesives are substantially absent.

27. The method of numbered embodiments 24 to 26, wherein the in situ laminate is not subjected to air- or hydro-entanglement processes.

28. The method of numbered embodiments 24 to 27, wherein filaments formed from the meltspinning are attenuated with air at a temperature of greater than 50 or 80 or 100 or 150° C.

29. The method of numbered embodiments 24 to 28, wherein the fibers that form from the filaments have an average diameter of greater than 4 or 6 or 8 or 10 or 12 µm.

30. The method of numbered embodiments 24 to 29, wherein the in situ laminate is mechanically stretched.

31. The method of numbered embodiments 24-30, wherein mechanical stretching or activation steps are absent from the process of making the in situ laminate.

32. A meltspinning apparatus comprising one or more dies, each die comprising two or more meltspinning zones, wherein each zone comprises a plurality of nozzles that are fluidly connected to the corresponding zone, and wherein each zone is fluidly connected to a melt extruder.

What is claimed is:

1. A method of making a meltspun in situ laminate comprising simultaneously meltspinning two or more polymer melts adjacent to one another to form adjacent fabrics, wherein layers that are adjacent to one another are in situ entangled with one another to form an interfacial region of mixed fibers between the layers, and
    wherein at least one fabric layer of the in situ laminate is an elastic layer that comprises a propylene-α-olefin elastomer having and an MFR of less than 80 dg/min, a $H_f$ of less than 80 J/g, and comonomer-derived content within the range from 5 to 30 wt %, by weight of the propylene-α-olefin elastomer.

2. The method of claim 1, wherein adhesives are absent between the layers of the in situ laminate.

3. The method of claim 1, wherein adjacent layers of the in situ laminate have a Peel Strength of greater than 10 grams.

4. The method of claim 1, wherein (a) the basis weight of the fabrics is not the same, (b) the average diameter of the fibers making up the fabrics is not the same, (c) the composition of the fabrics is not the same, (d) number density of fibers per unit area in adjacent fabrics is not the same, (e) the cross-sectional shape of the fibers is not the same (f), the cross-sectional morphology of the fibers of the fabrics are not the same, or (g) any combination of two or more of these descriptors.

5. The method of claim 1, wherein the layers that are adjacent to one another that are in situ entangled are formed simultaneously or nearly simultaneously.

6. The method of claim 1, wherein the two or more layers of the meltspun fabrics comprise at least two facing layers and an elastic layer, the elastic layer located between the two facing layers.

7. The method of claim 6, wherein the facing layers comprise a material selected from the group consisting of polypropylene, polyethylene, functionalized polyolefins, plastomers (ethylene-α-olefin copolymers), polyurethane, polyesters such as polyethylene terephthalate, polylactic acid, polyvinyl chloride, polytetrafluoroethylene, styrenic block copolymers, ethylene vinyl acetate copolymers, polyamide, polycarbonate, cellulosics, an elastomer, poly(acetylene), poly(thiophene), poly(aniline), poly(fluorene), poly(pyrrole), poly(3-alkythiophene), poly(phenylene sulphide), polynaphthalenes, poly(phenylene vinylene), poly(vinylidene fluoride), and blends of any two or more of these materials.

8. The method of claim 6, wherein the facing layers are intrinsically non-elastic such that when incorporated in the in situ laminate, the facing layers are non-constraining and extensible without any mechanical stretching.

9. The method of claim 6, wherein the facing layers have a basis weight within the range from 0.1 to 50 g/m², wherein the basis weight of the facing layers is at least 5% less than the basis weight of the elastic layer.

10. The method of claim 1, wherein the throughput of at least two adjacent polymer melts are equivalent or differs by a factor of greater than 1.5.

11. The method of claim 1, wherein the in situ laminate is not subjected to air- or hydro-entanglement processes.

12. The method of claim 1, wherein filaments formed from the meltspinning are attenuated with air at a temperature of greater than 50° C.

13. The method of claim 1, wherein the in situ laminate is mechanically stretched.

14. The method of claim 1, wherein the process comprises meltspinning the two or more polymer melts adjacent to one another from a single die.

15. A method of making a meltspun in situ laminate comprising simultaneously meltspinning two or more polymer melts adjacent to one another to form adjacent fabrics, wherein layers that are adjacent to one another are in situ entangled with one another to form an interfacial region of mixed fibers between the layers wherein the process comprises meltspinning the two or more polymer melts adjacent to one another from a single die.

* * * * *